United States Patent
Fujishiro et al.

(10) Patent No.: US 6,858,978 B2
(45) Date of Patent: Feb. 22, 2005

(54) MANUFACTURING METHOD OF SUPPORT FRAME OF DISPLAY PANEL, SUPPORT FRAME OF DISPLAY PANEL AND DISPLAY DEVICE

(75) Inventors: Fumihiko Fujishiro, Tokyo (JP); Hirokazu Fukuyoshi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 233 days.

(21) Appl. No.: 10/105,337

(22) Filed: Mar. 26, 2002

(65) Prior Publication Data

US 2002/0135294 A1 Sep. 26, 2002

(30) Foreign Application Priority Data

Mar. 26, 2001 (JP) ........................................ 2001-088848

(51) Int. Cl.[7] .................................................. H01J 63/04
(52) U.S. Cl. ..................... 313/493; 313/477 R; 313/422
(58) Field of Search .......................... 313/422, 493–495, 313/582–587, 461, 477 R

(56) References Cited

FOREIGN PATENT DOCUMENTS

| JP | 4-73714 | 9/1992 |
|---|---|---|
| JP | 8-112630 | 5/1996 |
| JP | 2000-39850 | 8/2000 |
| JP | 2000-314872 | 11/2000 |

OTHER PUBLICATIONS

Copy of Korean Office Action dated Feb. 7, 2004 (and English translation of relevant portion).

*Primary Examiner*—Joseph Williams
(74) *Attorney, Agent, or Firm*—Dickstein, Shapiro, Morin & Oshinsky, LLP.

(57) ABSTRACT

A method is provided for manufacturing a support frame of a rectangular display panel within a short working time. The method includes a process of taking out L-shaped component members each having convex portions and concave portions arranged alternately at an end portion in a manner that each of the convex portions and concave portions is bilaterally symmetrical, while a shear droop and a burr are formed on an end portion and process of fitting and coupling end portions of L-shaped component members by placing the convex portions and the concave portions in such a manner that the shear droop of each of the convex portions faces the burr of each of the concave portions and the burr of each of the convex portions faces the shear droop of each of the concave portions and that that the convex portions and the concave portions are pushed towards each other and by pressing the convex portions and the concave portions using a pair of metal molds.

18 Claims, 23 Drawing Sheets

| material | specific conductivity |
|---|---|
| copper | 1.00 |
| aluminum | 0.61 |
| brass | 0.26 |
| silver | 1.05 |
| iron | 0.17 |
| stainless steel | 0.02 |

MANUFACTURING METHOD OF SUPPORT FRAME OF DISPLAY PANEL, SUPPORT FRAME OF DISPLAY PANEL AND DISPLAY DEVICE

BACKGROUND OF THE INVENTION

1. Field of the Invention

The present invention relates to a method for manufacturing a support frame of a display panel being used as a display device for personal computers, TV (television) sets, or a like; and more particularly to the method of manufacturing the support frame of the rectangular display panel which is used to support a portion surrounding the rectangular display panel and to the support frame of the rectangular display panel manufactured by the above method and to the display device equipped with the above support frame.

The present application claims priority of Japanese Patent Application No.2001-088848 filed on Mar. 26, 2001, which is hereby incorporated by reference.

2. Description of the Related Art

As a rectangular display panel, an LCD (Liquid Crystal Display) panel, a PDP (Plasma Display Panel), or panels made up of light emitting elements such as an EL (Electroluminescence), an LED (Light Emitting Diode), a VFD (Vacuum Fluorescent Display), or a like are conventionally available. In the LCD panel, a region surrounded by a scanning electrode mounted in a row direction and by a data electrode mounted in a column direction is used as a pixel, and by feeding a data signal produced from an image signal to a data electrode and by feeding a scanning signal produced from a synchronous signal to the scanning electrode, a character or an image is displayed on a display screen. Also, in the LCD panel, a data electrode driving circuit adapted to generate the above data signal and a scanning electrode driving circuit adapted to generate the above scanning signal, together with control circuits used to control these circuits, gray-scale power source, or a like, are formed integrally as an LCD module. As shown in FIG. 29, in an LCD module 1, a front of a portion surrounding the LCD module 1 is supported by an approximately □-shaped front frame 2 and a rear of the portion surrounding the LCD module 1 is supported by an approximately □-shaped center frame 3.

In the LCD module 1 shown in FIG. 29, the control circuits, gray-scale power source, or a like are mounted on a printed board 4, while the data electrode driving circuit made up of semiconductor circuits (ICs) is mounted on a film carrier tape electrically connecting the printed board 4 and an LCD panel 5 by each of a plurality of corresponding data electrodes and is packaged as TCPs (Tape Carrier Packages) $6_1$ to $6_8$. The printed board 4 is attached to an upper frame $3_a$ of the center frame 3. Moreover, positioning members 7 (another positioning member 7 in a lower right portion is not shown) shown in FIG. 29 is used to correctly attach the LCD module 1 in a specified position of the center frame 3. In the positioning member 7 made of a resin, as shown in FIG. 30, two rectangular parallel-piped bodies 9 are formed integrally on an upper face of an approximately L-shaped substrate 8 in such a manner that axial lines of the two rectangular parallel-piped bodies 9 intersect each other at right angles and, in the vicinity of the two rectangular parallel-piped bodies 9, one circular hole 10 is formed. The positioning member 7 is fixed at the center frame 3 in a method as described below. That is, first, each of the two rectangular parallel-piped bodies 9 of the positioning member 7 is inserted, from a rear side of the center frame 3, into a larger size inserting hole 11 than each of upper areas of the two rectangular parallel-piped bodies 9 each being formed in four corners of the center frame 3. Then, a thread (not shown) is fitted, with some tolerance being allowed, into the circular hole 10 from a rear side of the L-shaped substrate 8 and is inserted fitly into a thread hole 12 formed in the vicinity of the inserting hole 11 of the center frame 3 to fix the positioning member 7 to the center frame 3.

The front frame 2 and the center frame 3 are conventionally manufactured by following methods. Hereinafter, the front frame 2 and center frame 3 are collectively called a "support frame". That is, after a pair of L-shaped component members is assembled in combination so that a rectangular structure is formed and both end edges of the pair of the L-shaped component members are melted and bonded to each other to form a rectangular frame plate member, the frame plate member is bent in a manner that the rectangular frame plate has an approximately L-shaped cross section, and the bent frame plate is used as the support frame. A manufacturing method of this type is disclosed in Japanese Patent Application Laid-open Nos. Hei 4-73714 and 2000-39850. Hereinafter, technology disclosed in these Patent Applications is called a "first conventional example".

Moreover, in a Japanese Patent Application Laid-open No. 2000-314872, another technology is disclosed. That is, in the example, as shown in FIG. 31, a □-shaped center frame 13 is assembled so as to have an approximately □-shaped configuration which is made up of two approximately L-shaped component members $13_a$ and $13_b$ and end portions of each of the L-shaped component members $13_a$ and $13_b$ are placed at corners of the □-shaped center frame 13 being diagonally opposite to each other. Moreover, as shown in FIGS. 32A and 32B, a fitting/coupling section 14 made up of plane pierce-shaped convex portions $14_a$ and plane pierce-shaped concave portions $14_b$ is provided at a place where the L-shaped component member $13_a$ is to be coupled to the L-shaped component member $13_b$ and another fitting/coupling section 15 with plane pierce-shaped convex portions $15_a$ and plane pierce-shaped concave portions $15_b$ is provided at a place where the L-shaped component member $13_a$ is also to be coupled to the L-shaped component member $13_b$. In the L-shaped component members $13_a$ and $13_b$, portions being extruded from a side line of each of the L-shaped component members $13_a$ and $13_b$ or being partitioned by dotted lines in side portions of each of the L-shaped component members $13_a$ and $13_b$ are bending margins $13_c$ to be used when the L-shaped component members $13_a$ and $13_b$ are bent so as to be approximately L-shaped in cross sections.

A constricted portion $14_c$ is formed in each of the plane pierce-shaped convex portions $14_a$ and a constricted portion $15_c$ is formed in each of the plane pierce-shaped convex portions $15_a$ and the constricted portion $14_c$ is formed in each of the plane pierce-shaped concave portions $14_b$ and the constricted portion $15_c$ in each of the plane pierce-shaped concave portions $15_b$ Therefore, this causes the plane pierce-shaped convex portions $14_a$ and the plane pierce-shaped concave portions $15_a$ to be tightly fitted each other, thus preventing them from being separated from each other in a horizontal direction. In the plane pierce-shaped convex portions $14_a$ and $15_a$ are formed boss portions $14_d$ and $15_d$ respectively in a half-punched state by a press working method.

Next, a method for manufacturing the center frame 13 is explained. First, the fitting/coupling sections 14 and 15 in each of the L-shaped component members $13_a$ and $13_b$ are positioned to be fitted from upward and downward directions to cause the plane pierced-shaped convex portions $14_a$ and $15_a$ to be mechanically fitted into the plane pierced-shaped concave portions $14_b$ and $15_b$. Next, when the fitting/coupling sections 14 and 15 are crimped from upward and downward directions by using a pressing machine, each of the boss portions $14_d$ and $15_d$ is plastic-deformed and expanded, which causes the plane pierce-shaped convex portions $14_a$ and $15_a$ and the plane pierce-shaped concave portions $14_b$ and $15_b$ to be fitted more tightly and to be integrated. Then, by bending the bending margins $13_c$ of each side using the pressing machine, the □-shaped center frame 13 having approximately the same shape as the □-shaped center frame 3 shown in FIG. 29 is manufactured. Hereinafter, this technology is called a "second conventional example".

However, the first conventional example has a disadvantage in that, since the melting and bonding processes are included in the method of manufacturing the support frame for the display panel provided in the first conventional example, generally, long working hours are required. Another problem is that, when a laser deposition method is used for the melting and bonding processes, in particular, additional special equipment has to be prepared.

On the other hand, the method for manufacturing the support frame for the display panel provided in the second conventional example also has a disadvantage in that, since the formation of the constricted portions $14_c$ and $15_c$ is necessary, if hardness of the employed component member is very high, it is difficult to form such the constricted portions $14_c$ and $15_c$ precisely. Thus, the constricted portions $14_c$ and $15_c$ cause low strength of the support frame itself. As a result, if the constricted portions $14_c$ and $15_c$ have not been precisely formed, when the plane pierce-shaped convex portions $14_a$ and $15_a$ and the plane pierce-shaped concave portions $14_b$ and $15_b$ are mechanically fitted, there is a danger that the fitting/coupling sections 14 and 15 would not be fitted completely. Moreover, depending on conditions applied when the plane pierce-shaped convex portions $14_a$ and $15_a$ and the plane pierce-shaped concave portions $14_b$ and $15_b$ are mechanically fitted, a case may occur in which both the plane pierce-shaped convex portions $14_a$ and $15_a$ and plane pierce-shaped concave portions $14_b$ and $15_b$ or either of the plane pierce-shaped convex portions $14_a$ and $15_a$ or plane pierce-shaped concave portions $14_b$ and $15_b$ are broken in the constricted portions $14_c$ and $15_c$. This means that, in the second conventional example, types of component members or manufacturing conditions that can be applied are limited and, if types of the component members are erroneously selected or the manufacturing conditions are erroneously set, defectives continuously occur and a yield is decreased, as a result. Furthermore, in the case of the second conventional example, after the plane pierce-shaped convex portions $14_a$ and $15_a$ and the plane pierce-shaped concave portions $14_b$ and $15_b$ are mechanically fitted, process of crimping the fitting/coupling sections 14 and 15 from upward and downward directions using the pressing machine is needed, which causes low productivity in manufacturing the support frame.

Furthermore, in an upper portion of the above LCD module 1, as shown in FIG. 29, a plurality of ICs making up the data electrode driving circuit is mounted on a film carrier tape which is packaged in a form of the TCPs $6_1$ to $6_8$. Since the plurality of ICs generates data signals to be fed to the data electrode in the LCD panel 5, high frequency noises of about several $kH_z$ to 1 $GH_z$ occur and, therefore, unless an electromagnetic shielding unit is provided, the noises cause an EMI (Electro Magnetic Interference) to other electronic devices. To solve this problem, it can be thought that, as a material for the front frame 2, iron or aluminum having high conductivity is used to have it serve also as an electromagnetic shielding unit. However, iron has a high specific gravity and high hardness and, therefore, when it is used for a large screen, a weight of a display device becomes high and iron is difficult to be processed. Aluminum has also a disadvantage because it is expensive. As a material for the front frame 2, conventionally, stainless steel is used which has low conductivity but small specific gravity and low hardness and, in a portion above the data electrode driving circuit, a copper foil having high conductivity is pasted up. Therefore, a process of pasting up the copper foil is additionally required which causes an increase in component counts and in the number of processes.

As shown in FIG. 33, in a lower portion of an upper frame section 2a of the front frame 2 are mounted the printed board 4, TCPs $6_1$ to $6_8$, or a like, while the upper frame section 2a of the front frame 2 is used as a terminal being of a ground level. Therefore, in the conventional support frame, in order to prevent the printed board 4, TCPs $6_1$ to $6_8$, or a like from being in contact with the upper frame section 2a of the front frame 2, an insulator 16 such as silicon rubber or a like is pasted up on a lower face of the upper frame section 2a of the front frame 2 to ensure insulation between the upper frame 2a of the front frame 2 and the TCPs $6_1$ to $6_8$. As a result, a process of pasting up the insulator 16 is additionally required which causes an increase in component counts and in the number of processes.

Moreover, in the conventional support frame, in order to attach the LCD module 1 exactly to a specified position in the center frame 3, the positioning member 7 is used. Therefore, a process of mounting the positioning member 7 is additionally required which also causes an increase in component counts and in the number of processes. Such the inconvenience as in the LCD also occurs more or less in the display panel such as PDP or panels made up of light emitting elements such as the EL, LED, VFD or a like in an approximately same manner.

SUMMARY OF THE INVENTION

In view of the above, it is a first object of the present invention to provide a method for manufacturing a support frame of a display panel which is capable of fabricating the support frame of the display panel having high strength within short working time, without use of additional special equipment, without limitations imposed by types of component members and/or manufacturing conditions and at a high level of productivity and to provide the support frame and the display panel using the support frame. It is a second object of the present invention to provide the method for manufacturing the support frame of the display panel which is capable of preventing EMI, insulating circuits, or positioning the display panel in small component counts and in small numbers of processes and to provide the support frame and the display panel using the support frame.

According to a first aspect of the present invention, there is provided a method for manufacturing a support frame of a rectangular display panel having an approximately □-shaped configuration and being used to support a portion surrounding the rectangular display panel, the method including:

a first process of taking out a plurality of component members each having convex portions and concave portions arranged alternately at an end portion of each of the plurality of the component members in a manner that each of the convex portions and the concave portions is bilaterally symmetrical and making up the support frame by being assembled in combination, while a shear droop and a burr are formed at each end portion of each of the plurality of the component members, from a plate material; and a second process of fitting and coupling end portions of the plurality of the component members by placing the convex portions making up the end portion of each of the plurality of the component members to be assembled in combination and the concave portions making up an end portion of each of the plurality of the component members to be assembled in combination in such a manner that the shear droop of each of the convex portions faces the burr of each of the concave portions and the burr of each of the convex portions faces the shear droop of each of the concave portions and, while a force (pressure) is applied so that the convex portions and the concave portions are pushed towards each other, by pressing both the convex portions and the concave portions in upward and downward directions using a pair of metal molds on which projected portions are formed on a surface of one or both of the metal molds in a position being apart by a specified distance from the each end portion of two of the component members to be assembled out of the plurality of the component members or from the end portion of one of the plurality of component members.

In the foregoing, a preferable mode is one wherein either of two component members to be fitted and coupled to each other out of the plurality of the component members is made of a metal having a different conductivity or made of a resin.

Also, a preferable mode is one wherein the component member made of the resin is so configured that conductive paint is painted or sprayed or the metal having high conductivity is deposited or plated only on an upper face of the component member.

Also, a preferable mode is one wherein, in the second process, the component member made of the resin, out of the plurality of the component members, is fixed and is not moved; and wherein the projected portion is not formed on a surface corresponding to the component member made of the resin, of the metal mold and making up the pair of the metal molds.

According to a second aspect of the present invention, there is provided a method for manufacturing a support frame of a rectangular display panel having an approximately □-shaped configuration and being used to support a portion surrounding the rectangular display panel, the method including:

a first process of taking out a component member made of a metal out of a plurality of the component members each having convex portions and concave portions arranged alternately at an end portion of each of-the plurality of the component members in a manner that each of the convex portions and the concave portions is bilaterally symmetrical and making up the support frame by being assembled in combination, while a shear droop and a burr are formed at each end portion of each of the plurality of the component members from a plate material; and a second process of fitting-and coupling end portions of two component members to be assembled in combination out of the plurality of the component members, in the case where the plurality of the component members to be assembled in combination is made of a same metal or made of a different metal, by placing the convex portions making up the end portion of one of the plurality of the component members and the concave portions making up the end portion of another of the plurality of the component members in such a manner that the shear droop of each of the convex portions faces the burr of each of the concave portions and the burr of each of the convex portions faces the shear droop of each of the concave portions and, while a force is applied so that the convex portions and the concave portions are pushed towards each other, by pressing both the convex portions and the concave portions in upward and downward directions using a pair of metal molds on which projected portions are formed on a surface of one of the metal molds in a position being a part by a specified distance from end portions of two of the component members out of the plurality of the component members or from an end portion of one of the plurality of the component members and, in the case where the plurality of the component members to be assembled in combination is made up of a first component member made of a metal and a second component member made of a resin, by placing the convex portions making up an end portion of the first component member or the second component member and the concave portions making up an end portion of the second component member or the first component member in such a manner that the shear droop of each of the convex portions faces the burr of each of the concave portions and the burr of each of the convex portions faces the shear droop of each of the concave portions and, while the end portion of the first component member is pushed toward the end portion of the second component member, by pressing the convex and concave portions in upward and downward directions using a pair of metal molds on which projected portions are formed on a surface of one of the metal molds in a position being apart by a specified distance from the end portion of the first component member.

In the foregoing, a preferable mode is one wherein the component member made of the resin is so configured that conductive paint is painted or sprayed or the metal having high conductivity is deposited or plated only on an upper face of the component member.

According to a third aspect of the present invention, there is provided a method for manufacturing a support frame of a rectangular display panel having an approximately □-shaped configuration and being used to support a portion surrounding the rectangular display panel, the method including:

a first process of taking out a first component member made of a metal and making up a side portion of the support frame having convex portions and concave portions arranged alternately at its end portion in a manner that each of the convex portions and the concave portions is bilaterally symmetrical and, while a shear droop and a burr are formed at each end portion of each of a plurality of component members, from a plate material; and a second process of fitting and coupling end portions of the plurality of component members by placing the convex portions and the concave portions making up an end portion of a second component member made of a resin making up a corner of the support frame and having the convex portions and the concave portions arranged alternately and having a positioning portion on its upper surface to be used for attaching the rectangular display panel to a predetermined place and the concave portions and the convex portions making up an end portion of the first component members in a manner that each of the convex portions and the concave portions is bilaterally symmetrical and in such a manner that the shear droop of each of the convex portions faces the burr of each of the concave portions and the burr of each of the convex portions faces the shear droop of each of the concave portions and, while the end portion of the first component member is being pushed toward the end portion of the second component member, by pressing the convex portions and the concave portions in upward and downward directions using a pair of metal molds on which projected portions are formed on a surface of one of the metal molds in a position being apart by a specified distance from the end portion of the first component member.

In the foregoing, a preferable mode is one wherein each of the convex portions and the concave portions has an approximately trapezoidal configuration.

Also, a preferable mode is one wherein each of the convex portions and the concave portions has an approximately figure-8-shaped configuration.

Also, a preferable mode is one wherein the projected portion is formed in parallel to each end face of each of the plurality of component members in a position being apart by a specified distance from each face of each of the plurality of component members so as to have a line-shaped configuration.

Also, a preferable mode is one wherein the projected portion is provided with a portion having a radius on both sides of its root.

Also, a preferable mode is one wherein the projected portion is a conical hole formed in a position approximately corresponding to a center of the convex portion.

Also, a preferable mode is one wherein the projected portion is a pyramidal hole formed in a position approximately corresponding to a root of the convex portion.

Also, a preferable mode is one wherein the projected portion is formed in a position approximately being symmetric with respect to a point of the pair of metal molds.

Also, a preferable mode is one wherein the projected portion, when each of the plurality of the component members to be assembled in combination is made of a same metal or a different metal, is formed in a position approximately being symmetric with respect to a point of the pair of metal molds.

Also, a preferable mode is one wherein, in the second process, when each of the plurality of the component members to be assembled in combination is made of a metal having high hardness, end portions of two component members to be assembled out of the plurality of the component members are fitted and coupled with a fitting and coupling member made of a metal having low hardness being interposed between the end portions of the two component members.

Also, a preferable mode is one wherein, in the second process, after end portions of each of the plurality of the component members are fitted and coupled while a jig used to prevent deformation of each end portion is being applied to a side face of each of the plurality of component members making up an outside of the display frame, a side portion of each of the plurality of component members making up an inside of the display frame is cut.

According to a fourth aspect of the present invention, there is provided a support frame of a rectangular display panel having an approximately □-shaped configuration and being used to support a portion surrounding the rectangular display panel, including:

a plurality of component members each having convex portions and concave portions arranged alternately at an end portion of each of the plurality component members in a manner that each of the convex portions and the concave portions is bilaterally symmetrical and having a shear droop and a burr at an end portion of each of the plurality of component members; and wherein the end portions of the plurality of component members are fitted and coupled by placing the convex portions and the concave portions in such a manner that the shear droop of each of the convex portions and each of the concave portions faces the burr of each of the concave portions and each of the convex portions.

In the foregoing, a preferable mode is one wherein either of two component members to be fitted and coupled to each other out of the plurality of the component members is made of a metal having a different conductivity or made of a resin.

Also, a preferable mode is one wherein the component member made of the resin is so configured that conductive paint is painted or sprayed or the metal having high conductivity is deposited or plated only on an upper face of the component member.

According to a fifth aspect of the present invention, there is provided a support frame of a rectangular display panel having an approximately □-shaped configuration and being used to support a portion surrounding the rectangular display panel, including:

a plurality of component members made of two or more kinds of metals each having a different conductivity or made of a resin each having convex portions and concave portions arranged alternately in a manner that each of the convex portions and the concave portions is bilaterally symmetrical at an end portion of each of the plurality of component members and each having a shear droop and a burr formed at an end portion of each of the plurality of component members; and wherein end portions of two component members to be assembled out of the plurality of the component members are fitted and coupled by placing the convex portions and the concave portions in such a manner that the shear droop of each of the convex portions faces the burr of each of the concave portions and the burr of each of the convex portions faces the shear droop of each of the concave portions.

In the foregoing, a preferable mode is one wherein the component member made of the resin is so configured that conductive paint is painted or sprayed or the metal having high conductivity is deposited or plated only on an upper face of the component member.

According to a sixth aspect of the present invention, there is provided a support frame of a rectangular display panel having an approximately □-shaped configuration and being used to support a portion surrounding the rectangular display panel, including:

a first component member made of a metal making up a side portion of the support frame and having convex portions and concave portions arranged alternately in a manner that each of the convex portions and the concave portions is bilaterally symmetrical at an end portion of the first component member and having a shear droop and a burr formed at an end portion of each of the first component member;

a second component member made of a resin making up a corner of the support frame and having convex portions and concave portions arranged alternately and having the shear droop and the burr formed at an end portion of each of the second component member and having a positioning portion on its upper surface to be used for attaching the rectangular display panel to a predetermined place; and wherein end portions of the first and second component members are fitted and coupled by placing the convex portions and the concave portions in such a manner that the shear droop of each of the convex portions faces the burr of each of the concave portions and the burr of each of the convex portions faces the shear droop of each of the concave portions.

In the foregoing, a preferable mode is one wherein each of the convex portions and the concave portions has an approximately trapezoidal configuration.

Also, a preferable mode is one wherein each of the convex portions and the concave portions has an approximately figure-8-shaped configuration.

Also, a preferable mode is one wherein a pair of the component members to be fitted and coupled is made of a metal having high hardness and end portions of the pair of the component members made of the metal having high hardness are fitted and coupled with a fitting and coupling member made of a metal having low hardness being interposed between the component members made of the metal having high hardness.

According to a seventh aspect of the present invention, there is provided a display device equipped with a support frame which supports a rectangular display panel and a portion surrounding the rectangular display panel described above.

With the above configuration, a plurality of component members each having convex portions and concave portions arranged alternately at an end portion of each of the plurality of component members in a manner that each of the convex portions and the concave portions is bilaterally symmetrical, while a shear droop and a burr are formed at each end portion of each of the plurality of component members is taken from a plate material. Next, the convex portions making up an end portion of one of the plurality of component members to be used for assembling and the concave portions making up an end portion of another of the plurality of component members to be used for assembling are placed in such a manner that the shear droop of each of the convex portions faces the burr of each of the concave portions and the burr of each of the convex portions faces the shear droop of each of the concave portions and that a force is applied so that the convex portions and the concave portions are pushed towards each other and by pressing the convex portions and the concave portions in upward and downward directions using a pair of metal molds on which projected portions are formed on a surface of one of the metal molds in a position being apart by a specified distance from an end portion of two of the component members out of the plurality of component members or from an end portion of one of the plurality of component members. As a result, end portions of the plurality of component members are fitted and coupled. Therefore, a support frame of a rectangular display panel can be manufactured within short working time, without use of special equipment, without limitations imposed by types of component members and/or manufacturing conditions and at a high level of productivity.

With another configuration as above, a component member made of a metal out of a plurality of the component members each having the convex portions and the concave portions arranged alternately at an end portion of each of the plurality of component members in a manner that each of the convex portions and the concave portions is bilaterally symmetrical and making up the support frame by being assembled, while a shear droop and a burr are formed at each end portion of each of the plurality of component members is taken out from a plate material and, in the case where the plurality of the component members to be assembled in combination is made up of component members made of a same metal or made of a different metal, the convex portions making up an end portion of one of the plurality of component members and the concave portions making up an end portion of another of the plurality of component members placed in such a manner that the shear droop of each of the convex portions faces the burr of each of the concave portions and the burr of each of the convex portions faces the shear droop of each of the concave portions and that a force is applied so that the convex portions and the concave portions are pushed towards each other and by pressing the convex and concave portions in upward and downward directions using a pair of metal molds on which projected portions are formed on a surface of one of the metal molds in a position being apart by a specified distance from an end portion of two of the component members out of the plurality of component members or from an end portion of one of the plurality of component members and, in the case where the plurality of the component members to be assembled in combination is made up of a first component member made of a metal and a second component member made of a resin, the convex portions making up an end portion of the first component member and the concave portions making up an end portion of the second component member placed in such a manner that the shear droop of each of the convex portions faces the burr of each of the concave portions and the burr of each of the convex portions faces the shear droop of each of the concave portions and that the end portion of the first component member is pushed toward the end portion of the second component member and by pressing the convex and concave portions in upward and downward directions using a pair of metal molds on which projected portions are formed on a surface of one of the metal molds in a position being apart by a specified distance from the end portion of the first component member, thus causing end portions of the plurality of component members to be fitted and coupled. Therefore, it is possible to take countermeasures against EMI and/or to insulate circuits in small component counts and in small numbers of processes.

With still another configuration as above, a first component member made of a metal and making up a side portion of the support frame having convex portions and concave portions arranged alternately at its end portion in a manner that each of the convex portions and the concave portions is bilaterally symmetrical, while a shear droop and a burr are formed at each end portion of each of the plurality of component members is taken out from a plate material. Then, the convex portions making up an end portion of a second component member made of a resin making up a corner of the support frame and having the convex portions and concave portions arranged alternately and having a positioning portion on its upper surface to be used for attaching the display panel to a predetermined place and the concave portions making up an end portion of the first component members in a manner that each of the convex portions and the concave portion is bilaterally symmetrical, are placed in such a manner that the shear droop of each of the convex portions faces the burr of each of the concave portions the burr of each of the convex portions faces the shear droop of each of the concave portions and, while the end portion of the first component member is pushed toward the end portion of the second component member, by pressing the convex and concave portions in upward and downward directions using a pair of metal molds on which projected portions are formed on a surface of one of the metal molds in a position being apart by a specified distance from the end portion of the first component member, thus causing end portions of a plurality of component members to be fitted and coupled. Therefore, it is possible to perform positioning of the display panel in small component counts and in small numbers of processes.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
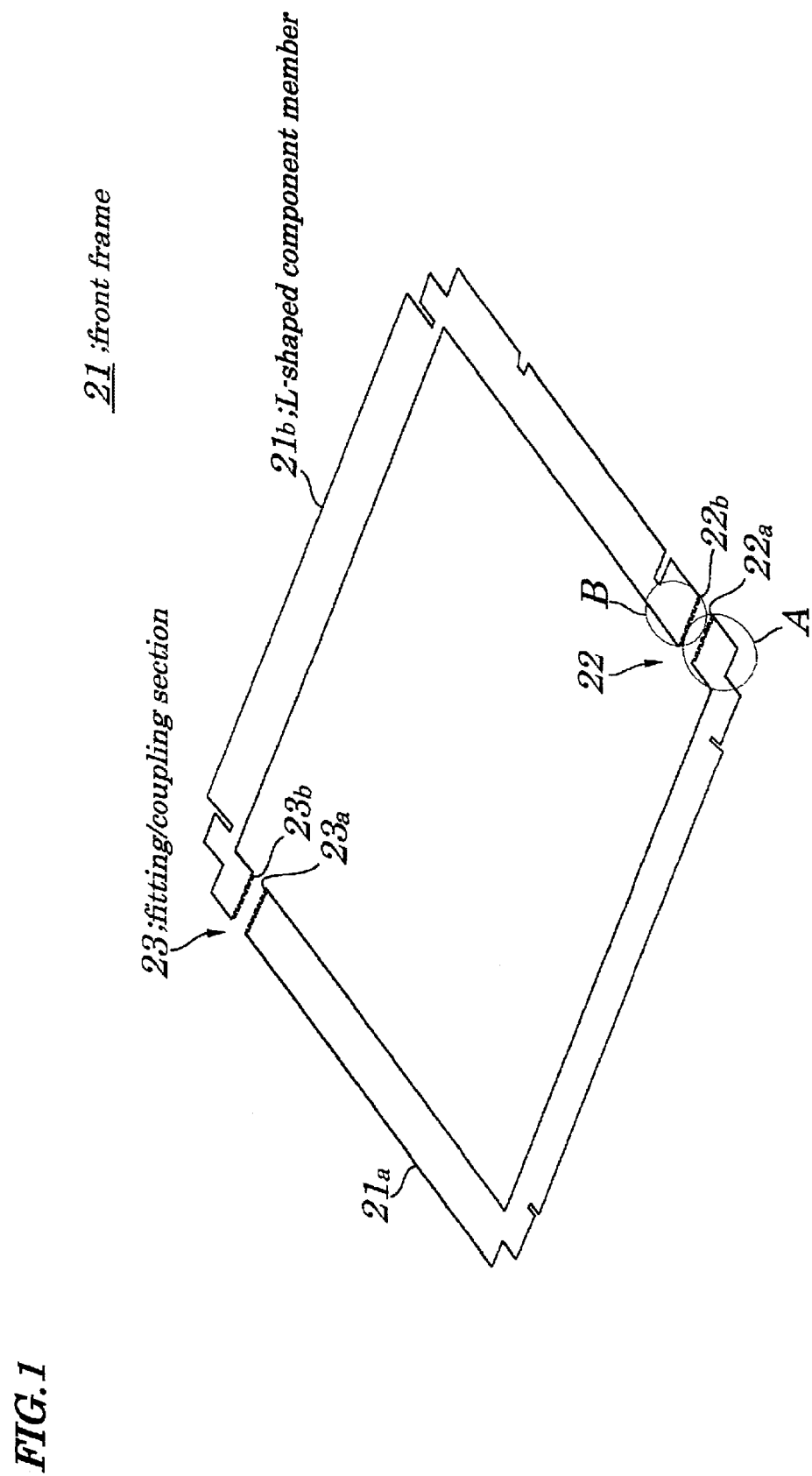
FIG. 1 is an exploded perspective view showing L-shaped component members making up a front frame in a developed state according to a first embodiment of the present invention.
Figure 2:
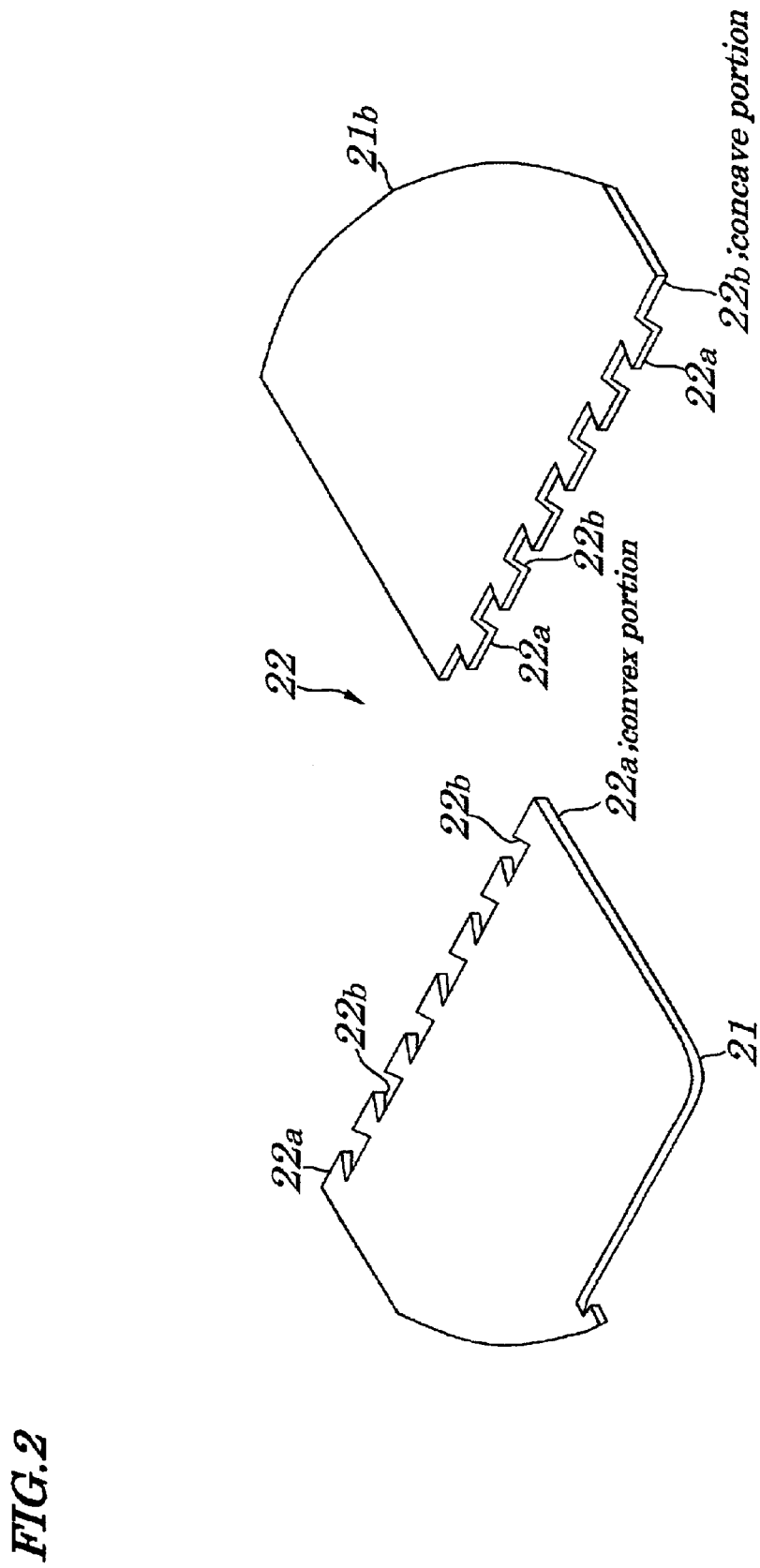
FIG. 2 is a partial expanded view of an A portion of one L-shaped component member of FIG. 1 and of a B portion of another L-shaped component member of FIG. 1.

FIG. 1 is an exploded perspective view showing L-shaped component members $21_a$ and $21_b$ making up a front frame 21 in a developed state according to a first embodiment of the present invention. The front frame 21 of the first embodiment is assembled so as to have an approximately ç-shaped configuration and is made up of two L-shaped component members $21_a$ and $21_b$ each end portion of which is disposed in a position being slightly apart from each of corner portions in a manner so as to have an approximately L-shaped configuration. Moreover, a fitting/coupling section 22 having convex portions $22_a$ and concave portions $22_b$ each of the convex portions $22_a$ and concave portions $22_b$ having a trapezoidal configuration is provided at a place where the L-shaped component member $21_a$ is coupled to the L-shaped component member $21_b$ and another fitting/coupling section 23 having convex portions $23_a$ and concave portions $23_b$ each of the convex portions $23_a$ and concave portions $23_b$ having a trapezoidal configuration is provided at a place where the L-shaped component member $21_a$ is coupled to the L-shaped component member $21_b$. FIG. 2 is an expanded view illustrating the fitting/coupling section 22 only. In FIG. 2, a diagram on a left side shows an expanded view of an A portion of FIG. 1 and a diagram on a right side shows an expanded view of a B portion of FIG. 1. The trapezoidal each of convex portions $22_a$ and $23_a$ (not shown in FIG. 2) and trapezoidal concave portions $22_b$ and $23_b$ (not shown in FIG. 2) is preferably bilaterally symmetrical when easiness in assembling and in fitting and coupling, strength of a display frame to be obtained after fitting and coupling processes, or a like are taken into consideration. Moreover, a size of each of the trapezoidal convex portions $22_a$ and $23_a$ and of trapezoidal concave portions $22_b$ and $23_b$ that is, a length of each of the trapezoidal convex portions $22_a$ and $23_a$ and of trapezoidal concave portions $22_b$ and $23_b$ in a direction orthogonal to an end face of an end portion of each of the L-shaped component members $21_a$ and $21_b$ serving as a portion for fitting and coupling between the L-shaped component members $21_a$ and $21_b$ is, for example, 2.0 mm. Furthermore, in each corner portion of each of the trapezoidal convex portions $22_a$ and $23_a$ and trapezoidal concave portions $22_b$ and $23_b$ a portion having a radius R is formed. The radius (R) is, for example, 0.1 mm. A portion having the same radius as above is formed in each of the trapezoidal convex portions $22_a$ and $23_a$ and the concave portions $22_b$ and $23_b$ described hereafter.

Figure 3:
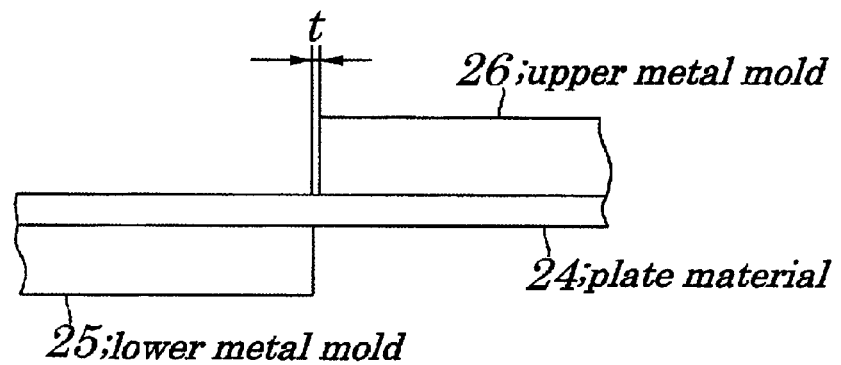
FIG. 3 is a schematic cross-sectional view explaining a process in which punching is performed on a stainless steel plate to produce the L-shaped component member according to the first embodiment of the present invention.
Figure 4:
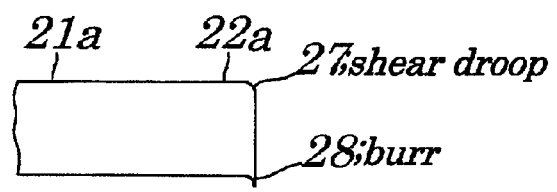
FIG. 4 is a schematic cross-sectional view explaining a shear droop and a burr produced in a convex portion of the L-shaped component member.

Next, a method for fabricating the front frame 21 will be described below. First, a method for fabricating the L-shaped component members $21_a$ and $21_b$ themselves is explained. As a material for the L-shaped component members $21_a$ and $21_b$ stainless steel is preferably used from a point of easiness in processing. Punching is performed, using a pressing machine, on a belt-shaped stainless steel plate material 24 being wound into a roll to produce the L-shaped component members $21_a$ and $21_b$. At this point, as shown in FIG. 3, between a lower metal mold 25 and an upper metal mold 26 both being used to perform punching on the belt-shaped stainless steel plate material 24 is provided a clearance "t" having a width being equal to about 12% of a thickness (for example, 1.0 mm) of the belt-shaped stainless steel plate material 24. The width of this clearance "t" is about two times larger than that (about 6%) employed in a normal case. As shown in FIG. 4, in an end portion of each of the L-shaped component members $21_a$ and $21_b$ obtained after the punching process, for example, in the convex portion $22_a$ of the L-shaped component member $21_a$, are formed a shear droop 27 which is a small part of an end portion of the L-shaped component member $21_a$ hanging down from a surface of the L-shaped component members $21_a$ and a burr 28 having a width being equal to about 10% of the thickness (for example, 1.0 mm) of the belt-shaped stainless steel plate material 24, which is a small part of the end portion of the L-shaped component member $21_a$ overhanging from a surface of the L-shaped component members $21_a$.

Figure 5:
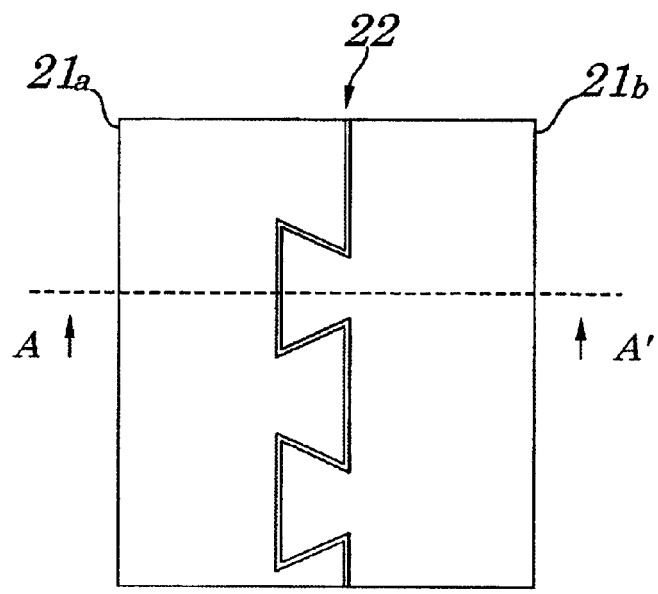
FIG. 5 is an expanded top view of a fitting/coupling section according to the first embodiment of the present invention.
Figure 6A:
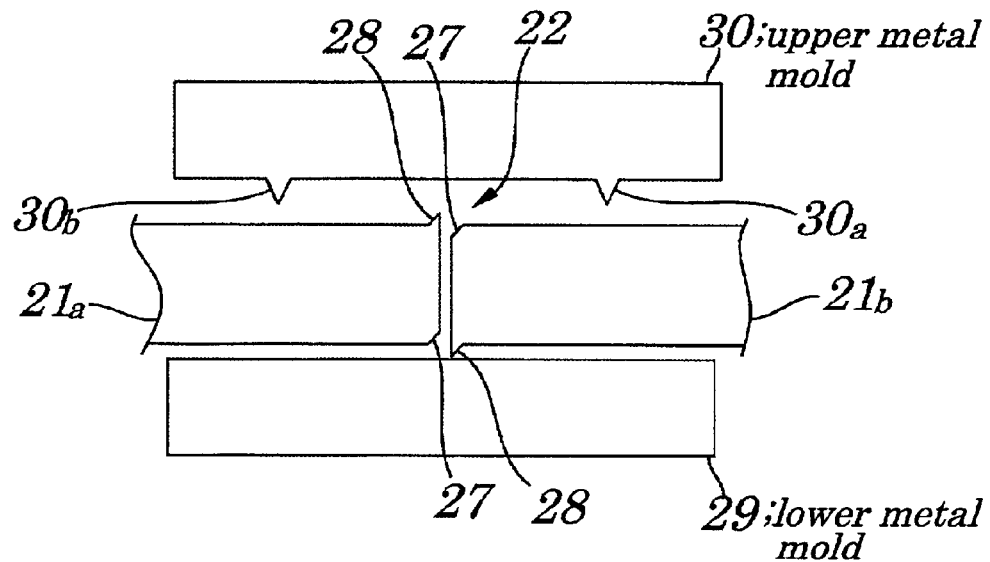
FIGS. 6A, 6B, and 6C are process diagrams explaining a method for fabricating the front frame according to the first embodiment of the present invention.
Figure 6B:
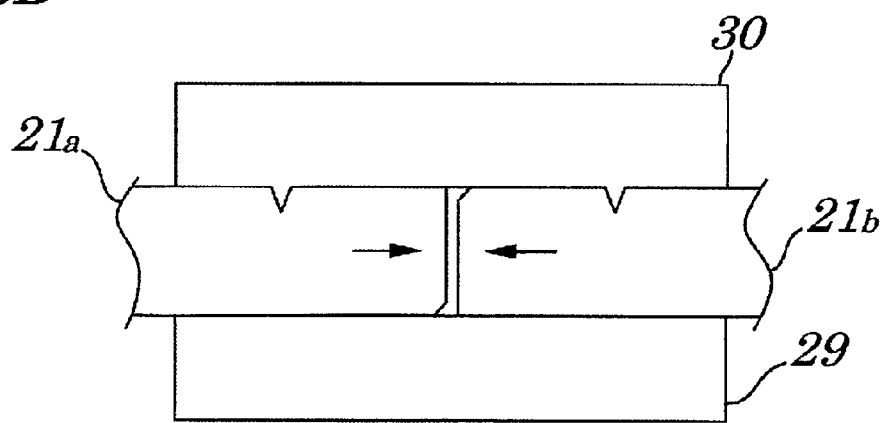
Figure 6C:
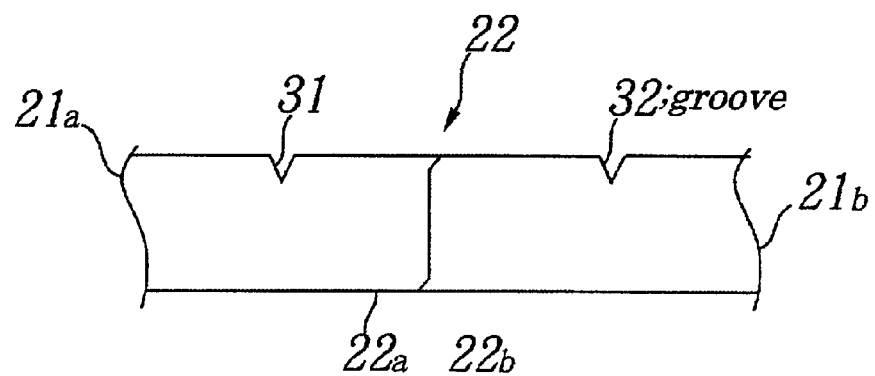
Figure 7:
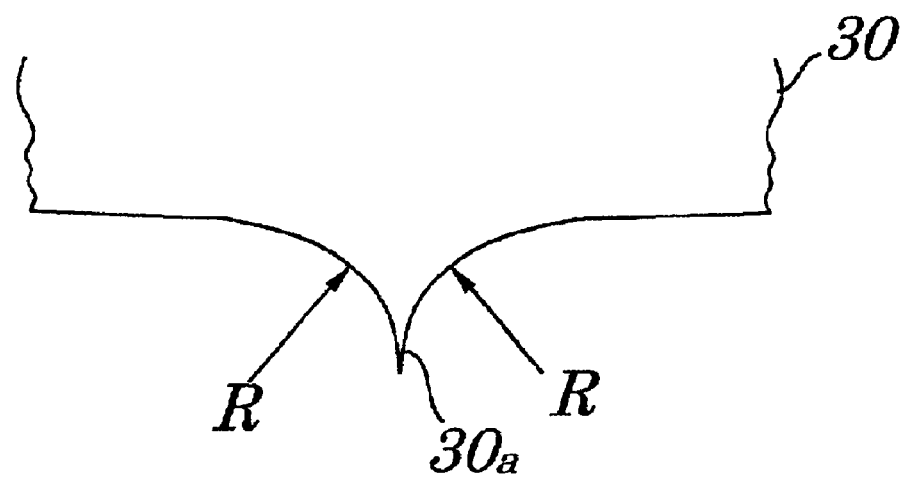
FIG. 7 is a partial expanded view of an upper metal mold used for manufacturing the front frame according to the first embodiment of the present invention.

Next, a method for fabricating the front frame 21 will be described by referring to FIGS. 5 and 6A, 6B, and 6C. First, in the fitting/coupling section 22 between the L-shaped component members $21_a$ and $21_b$, as shown in FIGS. 5 and 6A, the L-shaped component member $21_a$ is placed face to face with the L-shaped component member $21_b$ in such a manner that the shear droop 27 of the L-shaped component member $21_a$ faces the burr 28 of the L-shaped component member $21_b$ and therefore the burr 28 of the L-shaped component member $21_a$ faces the shear droop 27 of the L-shaped component member $21_b$ and then both the L-shaped component members $21_a$ and $21_b$ are put on a lower metal mold 29 and an upper metal mold 30 is put on both the L-shaped component members $21_a$ and $21_b$ so that the L-shaped component members $21_a$ and $21_b$ are fitted into each other and coupled to each other. FIG. 5 is an expanded top view of the fitting/coupling section 22 and FIGS. 6A, 6B, and 6C are cross-sectional views of FIG. 5 taken along a line A—A. When the L-shaped component member $21_a$ is placed face to face with the L-shaped component member $21_b$, there is a clearance having a width of about 0.05 mm to 0.10 mm between the L-shaped component members $21_a$ and $21_b$ in the fitting/coupling section 22. Moreover, as a material for the lower metal mold 29 and upper metal mold 30, hardened steel called "alloyed tool steel" is used. On a lower face of the upper metal mold 30 are formed line-shaped projected portions $30_a$ and $30_b$ in parallel to an end face of each of the L-shaped component members $21_a$ and $21_b$ at each of places being apart from the end face of each of the L-shaped component members $21_a$ and $21_b$ by a specified distance. Moreover, on both sides of a root of the line-shaped projected portion $30_a$, as shown in FIG. 7 in which only the line-shaped projected portion $30_a$ is shown, a portion having a radius R is formed. A height of each of the line-shaped projected portions $30_a$ and $30_b$ when a thickness of each of the L-shaped component members $21_a$ and $21_b$ is 0.4 mm to 1.0 mm, is 0.2 mm to 0.3 mm. Generally, the above height is preferably 20% to 30% of the thickness of the component member. Moreover, R is, for example, 0.1 mm.

Figure 29:
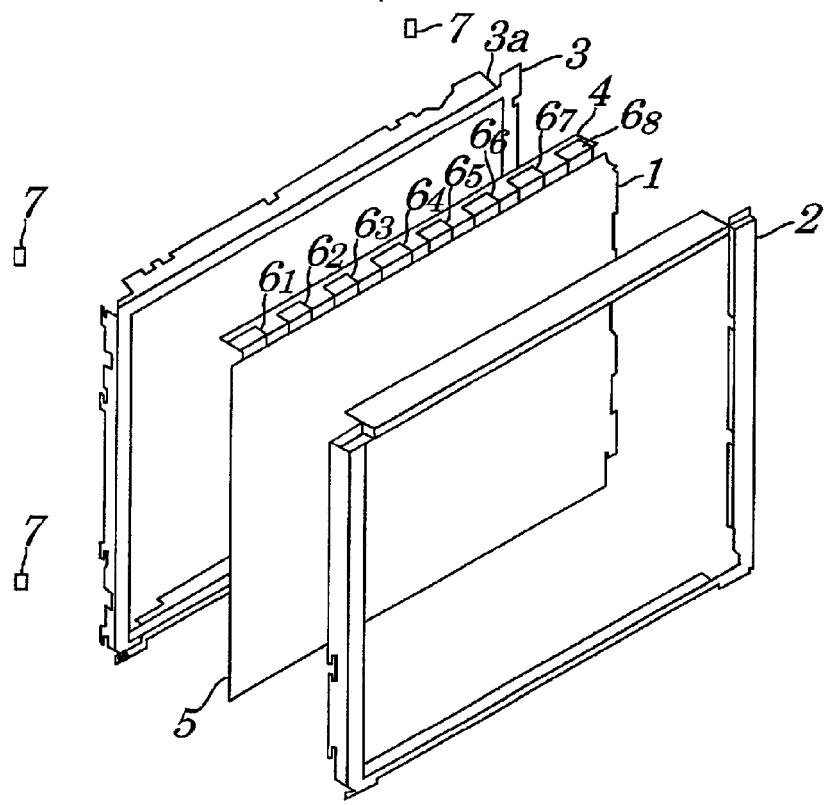
FIG. 29 is an exploded perspective view explaining an example of configurations of a conventional display device.
Figure 30:
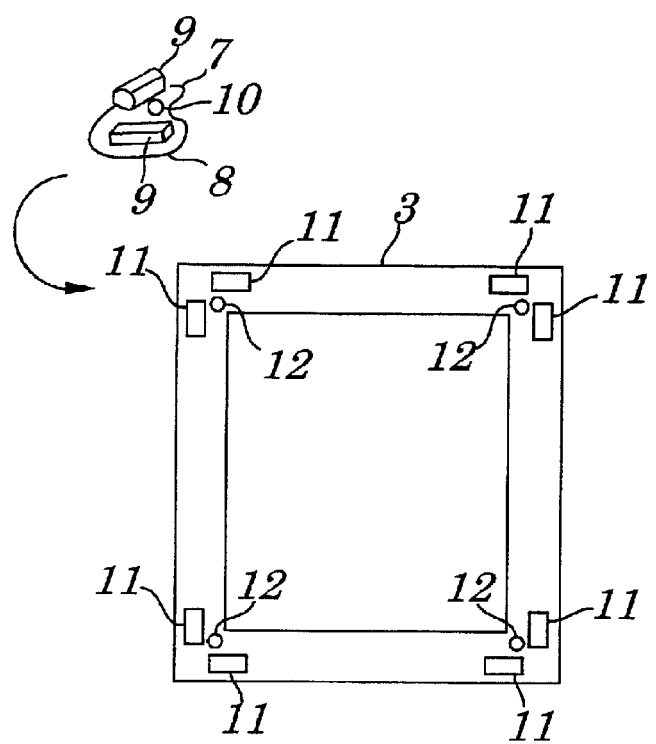
FIG. 30 is a schematic diagram explaining a process of attaching a positioning member to a center frame in the conventional display device.

Next, as shown by arrows in FIG. 6B, while a force (pressure) is being applied to both the L-shaped component members $21_a$ and $21_b$ SO that both end portions of the L-shaped component members $21_a$ and $21_b$ are pushed towards each other, the upper metal mold 30 is put on the L-shaped component members $21_a$ and $21_b$ with force being applied to them from an upper direction. In this case, the force used for pushing the upper metal mold 30 is, for example, about 10 tons and time during which pressing is made by the upper metal mold 30 is, for example, about one second. Since each of the line-shaped projected portions $30_a$ and $30_b$ is provided with the portion having a radius, each of the line-shaped projected portions $30_a$ and $30_b$ cuts into each of the L-shaped component members $21_a$ and $21_b$. As a result, a part of the L-shaped component member $21_a$ being equivalent to a volume of the line-shaped projected portion $30_b$ and the burr 28 move smoothly toward the shear droop 27 in the L-shaped component member $21_b$ and the burr 28 cuts into the shear droop 27 in the L-shaped component member $21_b$, while a part of the L-shaped component member $21_b$ being equivalent to a volume of the line-shaped projected portion $30_a$ and the burr 28 move smoothly toward the shear droop 27 in the L-shaped component member $21_a$ and the burr 28 cuts into the shear droop 27 in the L-shaped component member 21$_a$. Therefore, as shown in FIG. 6C, the convex portion 22$_a$ and concave portion 22$_b$ are fitted each other in a mechanical manner. At this point, each of the line-shaped projected portions 30$_a$ and 30$_b$ cut into each of upper surfaces of the L-shaped component member 21$_a$ and 21$_b$ on both sides of the fitting/coupling section and, as a result, grooves 31 and 32 each having an approximately V-shaped cross section are formed as shown in FIG. 6C. After the processes shown in FIGS. 6A, 6B, and 6C have been performed on the fitting/coupling section 23 between the L-shaped component member 21$_a$ and 21$_b$, as in the case of the above second conventional example, by bending a bending margin of each side using a pressing machine, the front frame 21 having the same shape as the front frame 2 shown in FIG. 29 is manufactured. Moreover, a center frame having the same shape as a center frame 3 shown in FIG. 29 is also manufactured by approximately the same method as described above.

Thus, according to the method of the first embodiment, the front frame 21 is produced by fitting and coupling the two approximately L-shaped component members 21$_a$ and 21$_b$ each other in the fitting/coupling sections 22 and 23, working time can be shortened more compared with the case in which the melting and bonding processes are employed and the use of special equipment is made unnecessary Also, according to the method of the first embodiment, since, in each of the fitting/coupling sections 22 and 23, the trapezoidal convex portions 22$_a$ and 23$_a$ and trapezoidal concave portions 22$_b$ and 23b are provided, such the constricted portions 14$_c$ and 15$_c$ as employed in the above second conventional example are not incorporated, the front frame 21 can be precisely formed and can have high strength, irrespective of strength of the component members.

Moreover, according to the method of the first embodiment, by intentionally forming the shear droops 27 and burrs 28 both in the L-shaped component members 21$_a$ and 21$_b$ and by placing the L-shaped component member 21$_a$ face to face with the L-shaped component member 21$_b$ in such a manner that the shear droop 27 of the L-shaped component member 21$_a$ faces the burr 28 of the L-shaped component member 21$_b$ and the burr 28 of the L-shaped component member 21$_a$ faces the shear droop 27 of the L-shaped component member 21$_b$ and further by forming the grooves 31 and 32 each having an approximately V-shaped cross section on the surfaces of both the L-shaped component members 21$_a$ and 21$_b$ using the upper metal mold 30 having the line-shaped projected portions 30$_a$ and 30$_b$ on their rear surfaces, the fitting/coupling sections 22 and 23 are coupled to each other. Therefore, unlike in the case of the second conventional example, no limitations are imposed by types of component members and/or manufacturing conditions and no process of further crimping the fitting/coupling sections 22 and 23 after they have been fitted in a mechanical manner is required, which can provide high productivity and sufficient strength to the support frame.

Second Embodiment

Figure 8A:
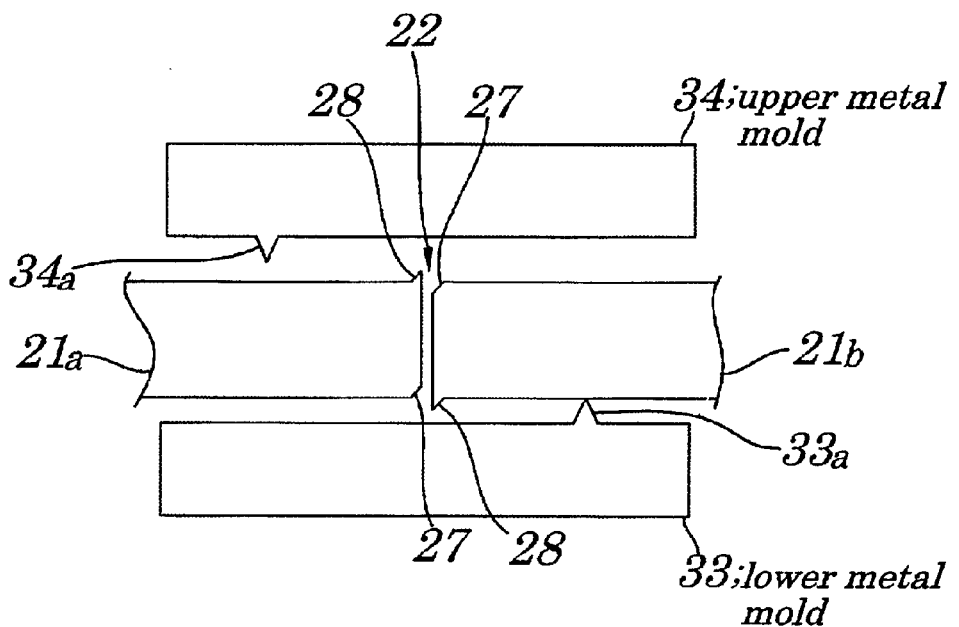
FIGS. 8A, 8B, and 8C are process diagrams explaining a method for fabricating a front frame according to a second embodiment of the present invention.
Figure 8B:
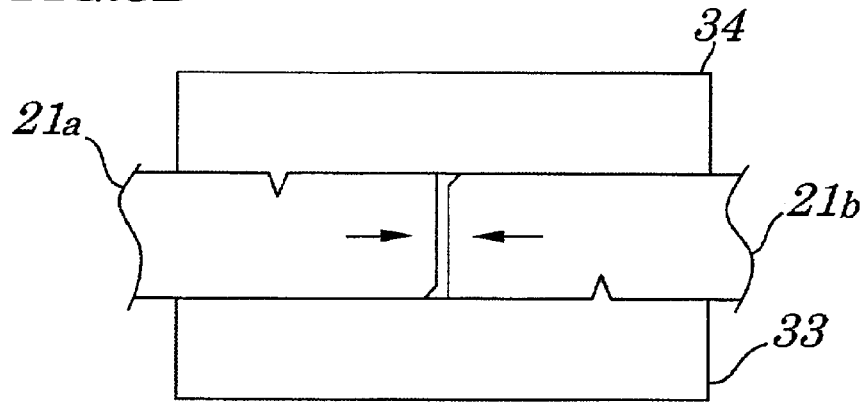
Figure 8C:
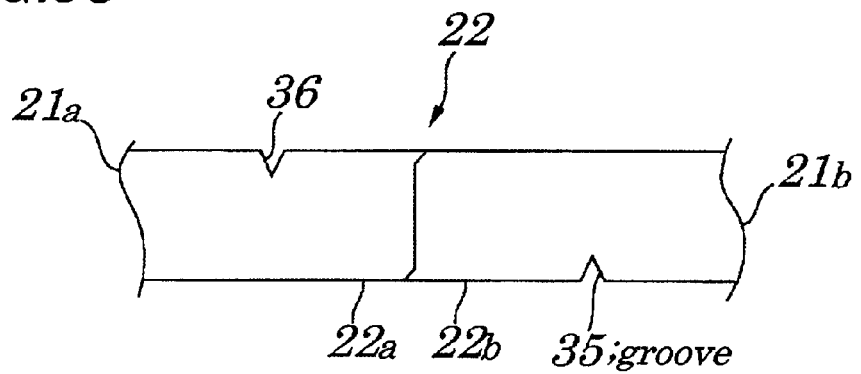

FIGS. 8A, 8B, and 8C are process diagrams explaining a method for fabricating a front frame 21 (FIG. 1) according to a second embodiment of the present invention. In FIGS. 8A, 8B, and 8C, same reference numbers are assigned to corresponding parts having same functions as those shown in FIGS. 6A, 6B, and 6C and their descriptions are omitted accordingly. In FIGS. 8A, 8B, and 8C, instead of a lower metal mold 29 and an upper metal mold 30 shown in FIGS. 6A, 6B, and 6C, a lower metal mold 33 and an upper metal mold 34 are newly provided. As a material for the lower metal mold 33 and upper metal mold 34, hardened steel called "alloyed tool steel" is generally used. A line-shaped projected portion 33$_a$ is formed on an upper surface of the lower metal mold 33 in a position being opposite to an L-shaped component member 21$_b$ and in parallel to an end face of the L-shaped component member 21$_b$ and in a place being apart by a specified distance from the end face of the L-shaped component member 21$_b$. A portion having a radius R is formed on both sides of a root of the line-shaped projected portion 33$_a$. On the other hand, a line-shaped projected portion 34$_a$ is formed on a lower surface of the upper metal mold 34 in a position being opposite to the L-shaped component member 21$_a$ and in parallel to an end face of the L-shaped component member 21$_a$ and in a place being apart by a specified distance from the end face of the L-shaped component member 21$_a$. A portion having a radius R is formed on both sides of a root of the line-shaped projected portion 34$_a$. A height of each of the line-shaped projected portions 33$_a$ and 34$_a$, when a thickness of each of the L-shaped component members 21$_a$ and 21$_b$ is 0.4 mm to 1.0 mm, is 0.2 mm to 0.3 mm. Generally, the height is preferably 20% to 30% of the thickness of the component member. Moreover, the L-shaped component members 21$_a$ and 21$_b$ themselves are manufactured by the same method as employed in the first embodiment.

Next, a method for fabricating a front frame 21 will be described by referring to FIGS. 8A, 8B, and 8C. First, as shown in FIG. 8A, in a fitting/coupling section 22 between the L-shaped component members 21$_a$ and 21$_b$ the L-shaped component member 21$_a$ is placed face to face with the L-shaped component member 21$_b$ in such a manner that shear droops 27 of the L-shaped component member 21$_a$ faces burr 28 of the L-shaped component member 21$_b$ and the burr 28 of the L-shaped component member 21$_a$ faces the shear droop 27 of the L-shaped component member 21$_b$ and then both the L-shaped component members 21$_a$ and 21$_b$ are put on the lower metal mold 33 and the upper metal mold 34 is put on both the L-shaped component members 21$_a$ and 21$_b$ So that the L-shaped component members 21$_a$ and 21$_b$ are fitted into each other and coupled to each other. When the L-shaped component member 21$_a$ is placed face to face with the L-shaped component member 21$_b$ there is a clearance having a width of about 0.05 mm to 0.10 mm between the L-shaped component members 21$_a$ and 21$_b$ in the fitting/coupling section 22.

Next, as shown in FIG. 8B, while a force is being applied to the L-shaped component members 21$_a$ and 21$_b$ so that end portions of the L-shaped component members 21$_a$ and 21$_b$ are pushed towards each other, the upper metal mold 34 is put on the L-shaped component members 21$_a$ and 21$_b$ with force being applied to them from an upper direction. In this case, the force used for pushing the upper metal mold 34 is, for example, about 10 tons and time during which pressing is made by the upper metal mold 34 is, for example, about one second. The line-shaped projected portion 33$_a$ cuts into the L-shaped component members 21$_b$ and the line-shaped projected portion 34$_a$ cuts into the L-shaped component member 21$_a$. As a result, since the portion having a radius R is formed in the line-shaped projected portion 33$_a$, a part of the L-shaped component member 21$_b$ being equivalent to a volume of the line-shaped projected portion 33$_a$ and the burr 28 move smoothly toward the shear droop 27 in the L-shaped component member 21$_b$ and the burr 28 cuts into the shear droop 27 in the L-shaped component member 21$_b$ while, since the portion having a radius R is formed in the line-shaped projected portion $34_a$, a part of the L-shaped component member $21_a$ being equivalent to a volume of the line-shaped projected portion $34_a$ and the burr 28 move smoothly to the shear droop 27 in the L-shaped component member $21_b$ and the burr 28 cuts into the shear droop 27 in the L-shaped component member $21_b$. Therefore, as shown in FIG. 8C, convex portions $22_a$ and $23_a$ and concave portions $22_b$ and $23_b$ are fitted each other in a mechanical manner. At this point, since the line-shaped projected portion $33_a$ cuts into a lower surface of the L-shaped component member $21_b$ and the line-shaped projected portion $34_a$ cuts into an upper surface of the L-shaped component member $21_a$, as shown in FIG. 8C, grooves 35 and 36 each having an approximately V-shaped cross section are formed in a position being approximately symmetric with respect to a point in the fitting/coupling section 22. Next, after the processes shown in FIGS. 8A, 8B, and 8C have been performed on a fitting/coupling section 23 between the L-shaped component member $21_a$ and $21_b$, as in the case of the above second conventional example, by bending a bending margin of each side using a pressing machine, the front frame 21 having the same shape as the front frame 2 shown in FIG. 29 is manufactured. Moreover, a center frame having the same shape as a center frame 3 shown in FIG. 29 is also manufactured by approximately the same method as described above.

Thus, according to the method of the second embodiment, since the line-shaped projected portions $33_a$ and $34_a$ on the lower metal mold 33 and the upper metal mold 34 respectively in a manner to be symmetric with respect to a point, the line-shaped projected portion $33_a$ moves the burr 28 in the L-shaped component member $21_b$ toward the shear droop 27 in the L-shaped component member $21_a$ and causes the burr 28 to be cut into the shear droop 27 in the L-shaped component member $21_a$, while the line-shaped projected portion $34_a$ moves the burr 28 in the L-shaped component member $21_a$ toward the shear droop 27 in the L-shaped component member $21_b$ and causes the burr 28 to be cut into the shear droop 27 in the L-shaped component member $21_b$. As a result, the fitting/coupling sections 22 and 23 can be fitted in and coupled to each other more reliably compared with the case of the first embodiment. This causes the strength of the fitting/coupling sections 22 and 23 to be greater than compared with the case of the first embodiment.

Third Embodiment

Figure 9:
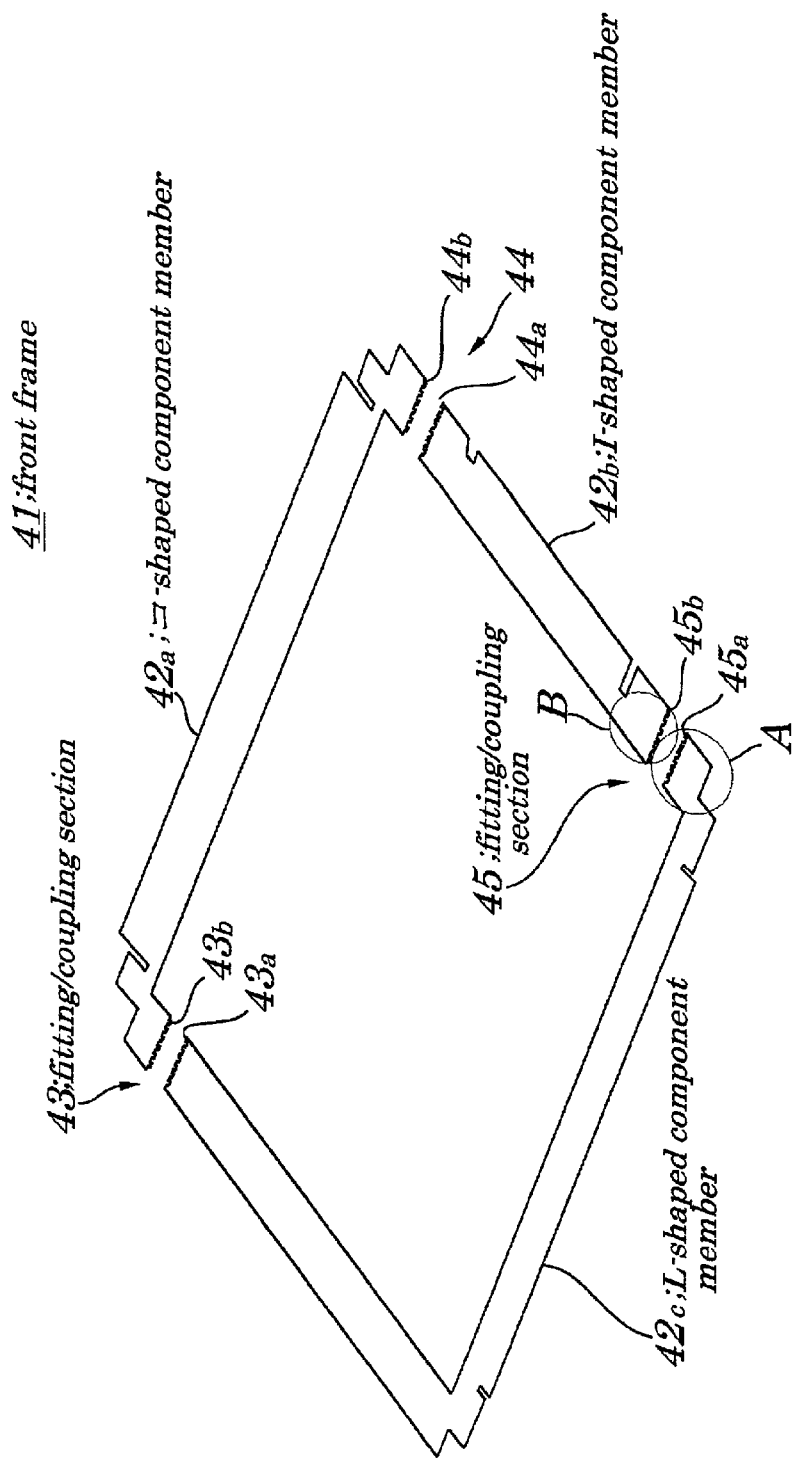
FIG. 9 is an exploded perspective view showing a ⊐-shaped component member, an I-shaped component member, and an L-shaped component member making up a front frame in a developed state according to a third embodiment of the present invention.

FIG. 9 is an exploded perspective view of a ⊐-shaped component member $42_a$. an I-shaped component member $42_b$, and an L-shaped component member $42_c$ making up a front frame 41 in a developed state according to a third embodiment of the present invention.

Figure 10:
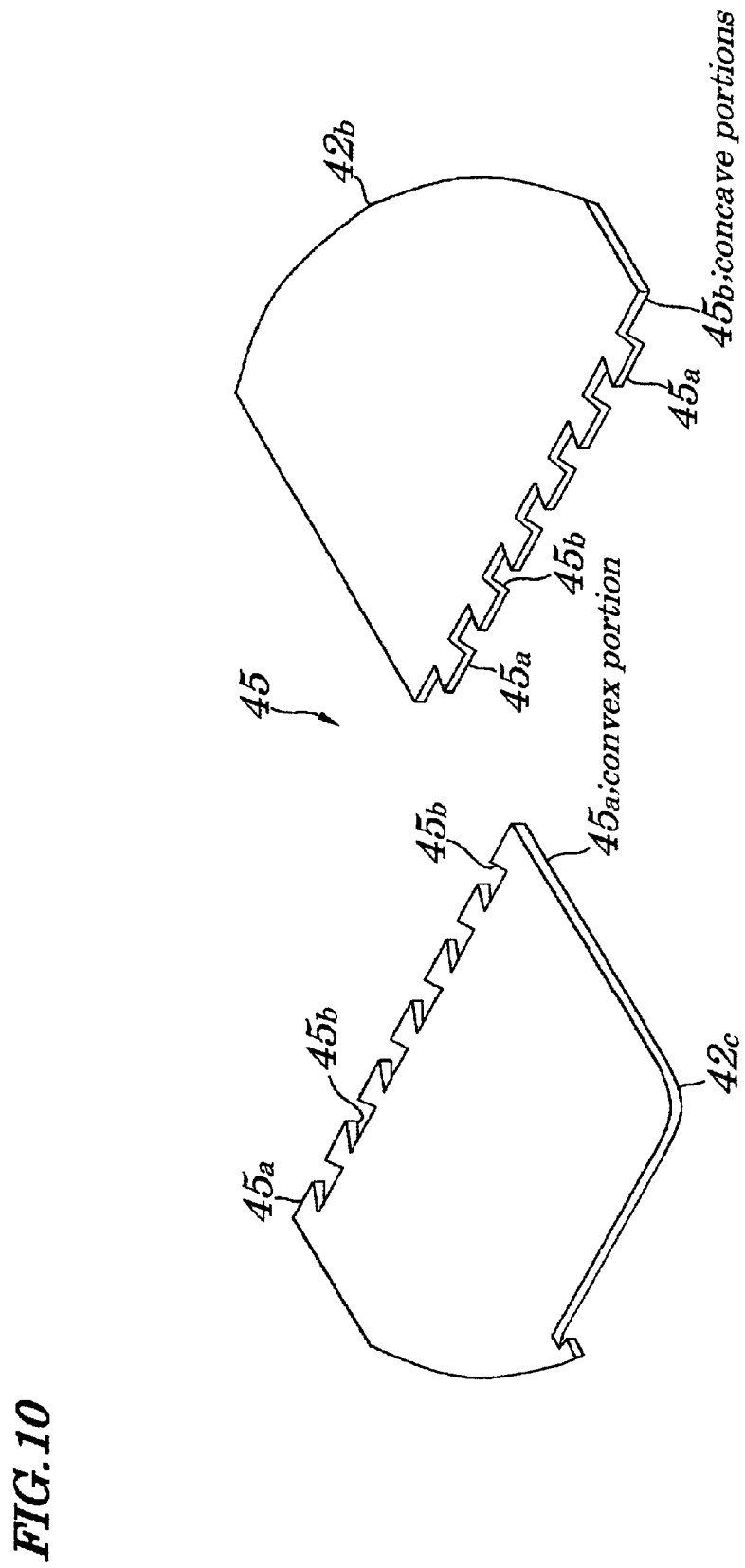
FIG. 10 is a partial expanded view of an A portion of an L-shaped component member of FIG. 1 and of a B portion of another L-shaped component member of FIG. 1 according to the third embodiment of the present invention.

The front frame 41 of the third embodiment is assembled so as to have an approximately □-shaped configuration and is made up of an approximately ⊐-shaped component member $42_a$ making up its upper portion, an approximately I-shaped component member $42_b$ making up its right side portion, and an approximately L-shaped component member $42_c$ making up its left side portion and its lower portion. A fitting/coupling section 43 having trapezoidal convex portions $43_a$ and trapezoidal concave portions $43_b$ is provided at a place where the ⊐-shaped component member $42_a$ is coupled to the approximately L-shaped component member $42_c$, a fitting/coupling section 44 having trapezoidal convex portions $44_a$ and trapezoidal concave portions $44_b$ is provided at a place where the ⊐-shaped component member $42_a$ is coupled to the approximately I-shaped component member $42_b$ and fitting/coupling section 45 having trapezoidal convex portions $45_a$ and trapezoidal concave portions $45_b$ is provided at a place where the approximately I-shaped component member $42_b$ is coupled to the approximately L-shaped component member $42_c$. FIG. 10 is an expanded view explaining the fitting/coupling section 45 only. In FIG. 10, a diagram on a left side is an expanded view of an A portion of FIG. 9 and a diagram on a right side is an expanded view of a B portion of FIG. 9. In FIGS. 9 and 10, each of the trapezoidal convex portions $43_a$, $44_a$, and $45_a$ and trapezoidal concave portions $43_b$, $44_b$, and $45_b$ is preferably bilaterally symmetrical when easiness in assembling, in fitting and coupling and, strength of a display frame to be obtained after the fitting and coupling processes have been performed are taken into consideration.

Figures 11, 12:
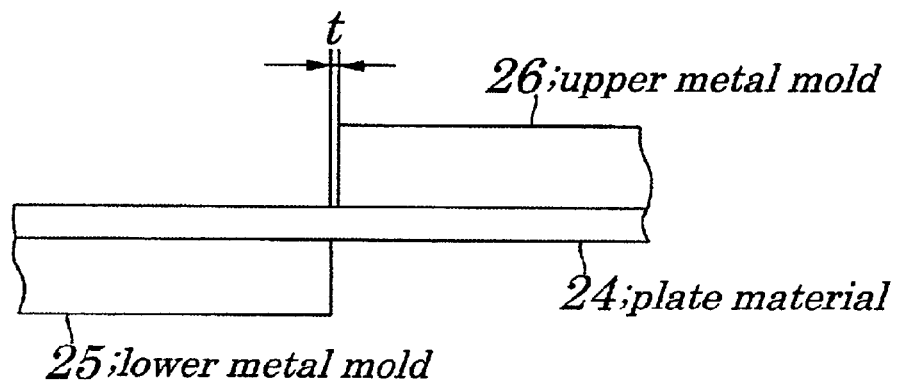
FIG. 11 is a table showing materials for the ⊐-shaped component member and their specific conductivity according to the third embodiment of the present invention.
FIG. 12 is a schematic cross-sectional view explaining a process of producing the ⊐-shaped component member, the I-shaped component member, and the L-shaped component member by performing punching on a metal plate according to the third embodiment of the present invention;.
Figure 13:
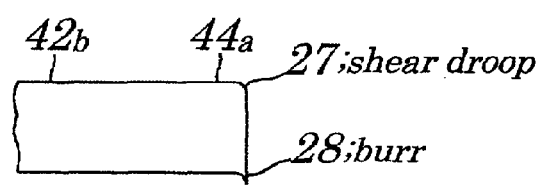
FIG. 13 is a schematic cross-sectional view explaining a shear droop and a burr produced in a convex portion of the I-shaped component member according to the third embodiment of the present invention.

Next, a method for fabricating the front frame 41 will be explained below. First, a method of fabricating the ⊐-shaped component member $42_a$, the I-shaped component member $42_b$, and the L-shaped component member $42_c$ themselves is explained. As a material for the component members $42_b$ and $42_c$ other than the ⊐-shaped component member $42_a$, stainless steel is preferably used from a view point of processing. On the other hand, since TCPs $6_1$ to $6_8$ and/or printed board 4 (see FIG. 29) are disposed below the ⊐-shaped component member $42_a$, as a material for the ⊐-shaped component member $42_a$, a metal having high conductivity such as copper, aluminum, iron, or a like is used, in order to prevent EMI. FIG. 11 shows specific conductivity of each of materials at a frequency of 0 to 150 kHz when conductivity of copper ($5.5 \times 10^7$ s/m) is defined to be 1 (one). As the material for the ⊐-shaped component member $42_a$ in addition to copper, aluminum, or iron, galvanized iron being generally used as a shielding material may be employed. Punching is performed, by using a pressing machine, on a belt-shaped plate material 24, being wound into a roll, made of stainless steel, copper, aluminum, iron, or galvanized iron to produce the ⊐-shaped component member $42_a$, the I-shaped component member $42_b$, and the L-shaped component member $42_c$. At this point, as shown in FIG. 12, between a lower metal mold 25 and an upper metal mold 26 both being used to perform punching on the belt-shaped plate material 24 is provided a clearance "t" having a width being equal to about 12% of a thickness (for example, 1.0 mm) of the belt-shaped plate material 24. The width of this clearance is about two times larger than that (about 6%) employed in a normal case. As shown in FIG. 13, in an end portion of each of the ⊐-shaped component member $42_a$, the I-shaped component member $42_b$, and the L-shaped component member $42_c$, for example, in the convex portion $44_a$, are formed a shear droop 27 which is a small part of an end portion of the belt-shaped plate material 24 occurring after being punched and hanging down from a surface of each of the ⊐-shaped component member $42_a$, the I-shaped component member $42_b$ and the L-shaped component member $42_c$ and a burr 28 having a width being equal to about 10% of the thickness (for example, 1.0 mm) of the belt-shaped plate material 24 which is also a small part of the end portion of the belt-shaped plate material 24 occurring after being punched and overhanging from a surface of each of the ⊐-shaped component member $42_a$, the I-shaped component member $42_b$, and the L-shaped component member $42_c$.

Figure 14:
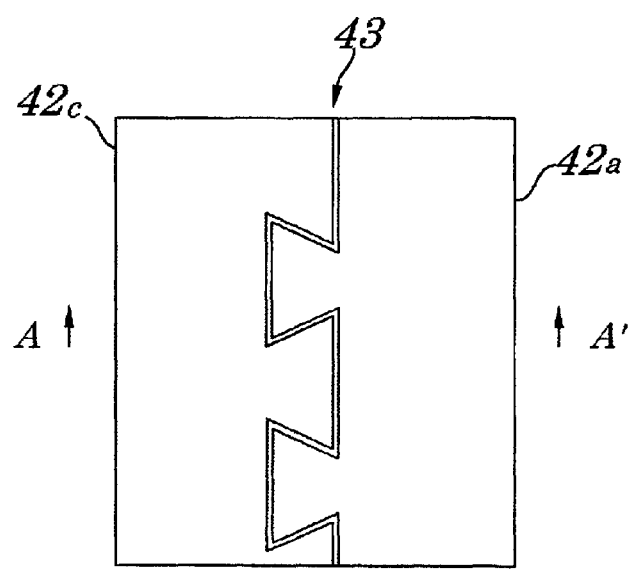
FIG. 14 is an expanded top view of a fitting/coupling section according to the third embodiment of the present invention.
Figure 15A:
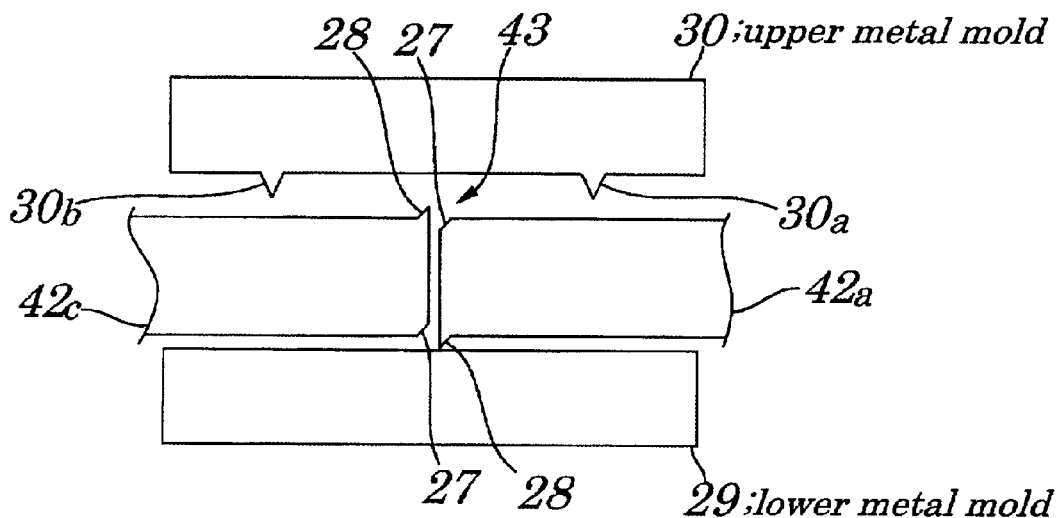
FIGS. 15A, 15B, and 15C are process diagrams explaining a method for fabricating the front frame of the third embodiment of the present invention.
Figure 15B:
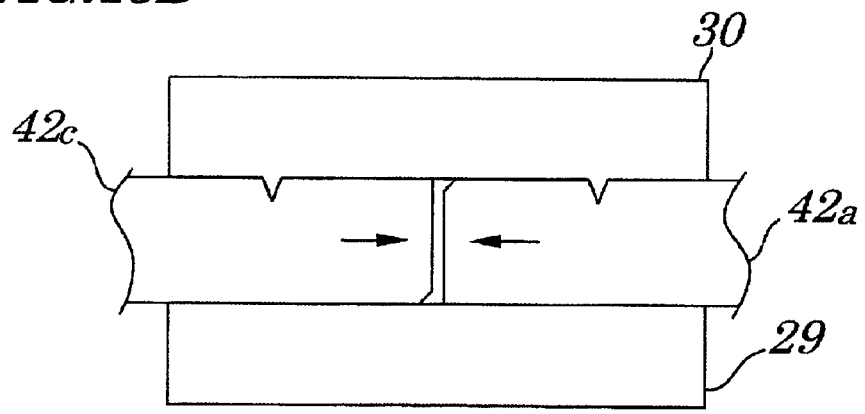
Figure 15C:
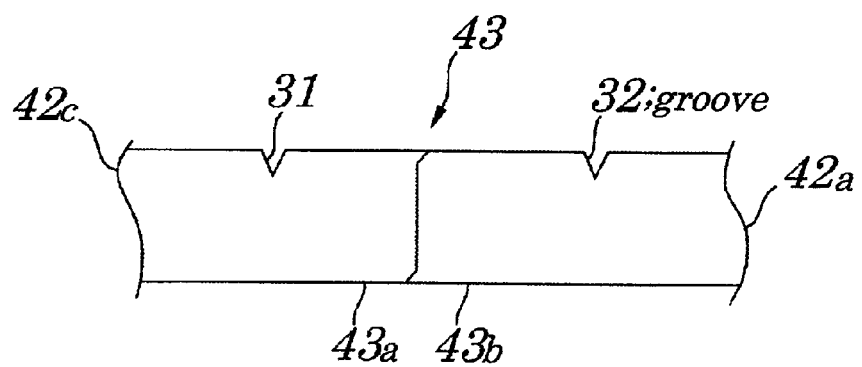
Figure 16:
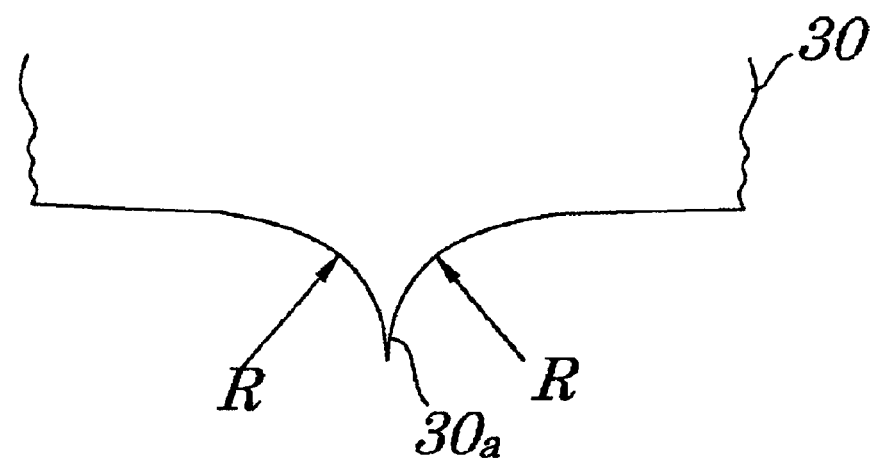
FIG. 16 a partial expanded view of an upper metal mold used for manufacturing the front frame according to the third embodiment of the present invention.

Next, a method for fabricating the front frame 41 will be described by referring to FIGS. 14 and 15A, 15B, and 15C. First, in the fitting/coupling section 43 between the ⊐-shaped component member $42_a$ and the L-shaped component member $42_c$, as shown in FIGS. 14 and 15A, the ⊐-shaped component member $42_a$ is placed face to face with the L-shaped component member $43_c$ in such a manner that the shear droop 27 of the ⊐-shaped component member $42_a$ faces the burr 28 of the L-shaped component member $43_c$ and the burr 28 of the L-shaped component member $43_a$ faces the shear droop 27 of the L-shaped component member $42_c$ and then both the ⊐-shaped component member $42_a$ and the L-shaped component member $42_c$ are put on the lower metal mold 29 and the upper metal mold 30 is put on both the ⊐-shaped component member $42_a$ and the L-shaped component member $42_c$ so that the ⊐-shaped component member $42_a$ and the L-shaped component member $42_c$ are fitted into each other and coupled to each other. FIG. 14 is an expanded top view explaining the fitting/coupling section 43 and FIGS. 15A, 15B, and 15C are cross-sectional views of FIG. 14 taken along a line A–A'. When the ⊐-shaped component member $42_a$ is placed face to face with the L-shaped component member $42_c$ there is a clearance having a width of about 0.05 mm to 0.10 mm between the ⊐-shaped component member $42_a$ and the L-shaped component member $42_c$ in the fitting/coupling section 43. Moreover, as a material for the lower metal mold 29 and upper metal mold 30, hardened steel called "alloyed tool steel" is used. On a lower surface of the upper metal mold 30 are formed line-shaped projected portions $30_a$ and $30_b$ in parallel to each end face of the ⊐-shaped component member $42_a$ and the L-shaped component member $42_c$ at places each being apart from each end face of the ⊐-shaped component member $42_a$ and the L-shaped component member $42_c$ by a specified distance. On both sides of a root of each of the line-shaped projected portion $30_a$ and $30_b$, as shown in FIG. 16 in which only the line-shaped projected portion $30_a$ is shown, a portion having a radius R is formed. A height of each of the line-shaped projected portions $30_a$ and $30_b$, when a thickness of each of the ⊐-shaped component member $42_a$, the I-shaped component member $42_b$, and the L-shaped component member $42_c$ is 0.4 mm to 1.0 mm, is 0.2 mm to 0.3 mm. Generally, the height is preferably 20% to 30% of the thickness of the component member.

Next, as shown by arrows in FIG. 15B, while a force is being applied to each of the ⊐-shaped component member $42_a$ and the L-shaped component member $42_c$ so that end portions of the ⊐-shaped component member $42_a$ and the L-shaped component member $42_c$ are pushed towards each other, the upper metal mold 30 is put on the ⊐-shaped component member $42_a$ and the L-shaped component member $42_c$ with force being applied to them. In this case, the force used for pushing the upper metal mold 30 is, for example, about 10 tons and time during which pressing is made by the upper metal mold 30 is, for example, about one second. Since each of the line-shaped projected portions $30_a$ and $30_b$ is provided with the portion having a radius R, each of the line-shaped projected portions $30_a$ and $30_b$ cuts into each of the ⊐-shaped component member $42_a$ and the L-shaped component member $42_c$. As a result, a part of the L-shaped component member $42_c$ being equivalent to a volume of the line-shaped projected portion $30_b$ and the burr 28 move smoothly toward the shear droop 27 in the ⊐-shaped component member $42_a$ and the burr 28 cuts into the shear droops 27 in the ⊐-shaped component member $42_a$, while a part of the ⊐-shaped component member $42_a$ being equivalent to a volume of the line-shaped projected portion $30_a$ and the burr 28 move smoothly toward the shear droop 27 in the L-shaped component member $42_c$ and the burr 28 cuts into the shear droop 27 in the L-shaped component member $42_c$. Therefore, as shown in FIG. 15C, even if the material for ⊐-shaped component member $42_a$ is, for example, aluminum and even if the material for the L-shaped component member $42_c$ is stainless steel, the convex portion 43 and concave portion $43_b$ are fitted each other in a mechanical manner. At this point, the line-shaped projected portions $30_a$ and $30_b$ cut into upper surfaces of the ⊐-shaped component member $42_a$ and the L-shaped component member $42_c$ on both sides of the fitting/coupling section 43 and, as a result, grooves 31 and 32 each having an approximately V-shaped cross section are formed as shown in FIG. 15C. Next, after the processes shown in FIGS. 15A, 15B, and 15C have been performed on the fitting/coupling section 44 between the ⊐-shaped component member $42_a$ and the L-shaped component member $42_c$ and on the fitting/coupling section 45 between the I-shaped component member $42_b$ and the L-shaped component member $42_c$, as in the case of the above second conventional example, by bending the bending margin of each side using the pressing machine, the front frame 41 having the same shape as the front frame 2 shown in FIG. 29 is manufactured.

Moreover, the prevention against the EMI is not required for the center frame 3. Therefore, the center frame 3 can be manufactured by using the two component members made of the same material each having an approximately L-shaped configuration, each end portion of which exists at a place being slightly apart from each of the corner portions and by assembling the two component members (not shown) so as to form an approximately ▢-shaped configuration and by assembling the fitting/coupling section (not shown) in accordance with the processes shown in FIGS. 15A, 15B, and 15C.

Thus, according to the method of the third embodiment, since the metal such as copper, aluminum, iron, or a like is used only for the upper frame portion where countermeasures against the EMI have to be taken, a weight of the display device can be made less than compared with a case where iron is used for an entire configuration of the front frame 41 and easy processing is made possible.

Also, according to the method of the third embodiment, costs of the display device can be reduced compared with a case where expensive aluminum is used for an entire configuration of the front frame 41.

Moreover, according to the method of the third embodiment, since component counts and number of processes can be reduced compared with a case where stainless steel is used for the entire configuration of the front frame 41 and copper foil is pasted on a lower face of its upper frame portion, costs of the display device can be made less.

Fourth Embodiment

Figure 17A:
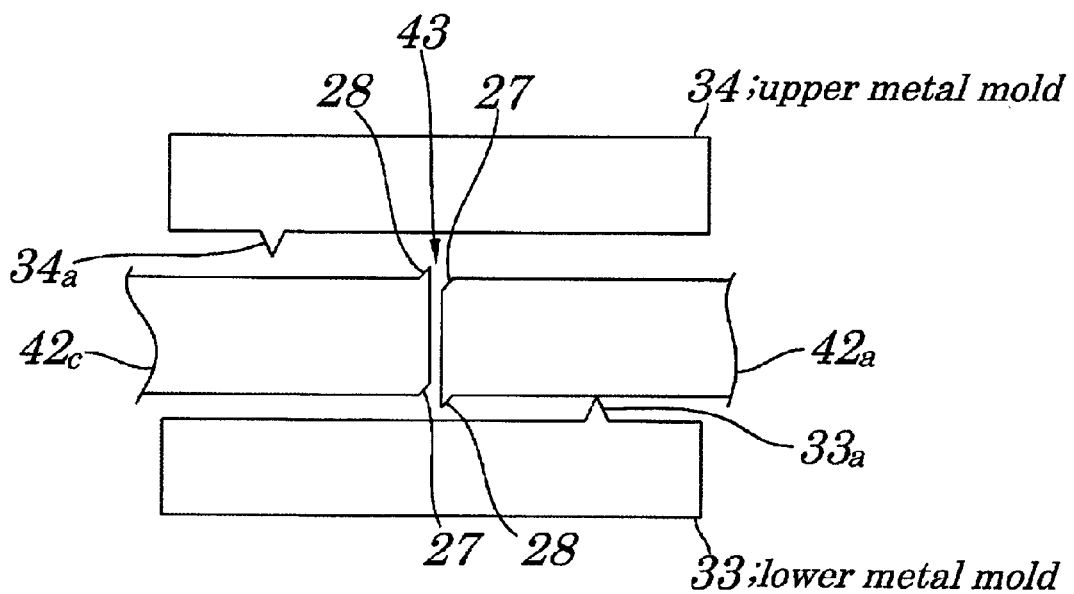
FIGS. 17A, 17B, 17C are process diagrams showing a method for fabricating a front frame of a fourth embodiment of the present invention.
Figure 17B:
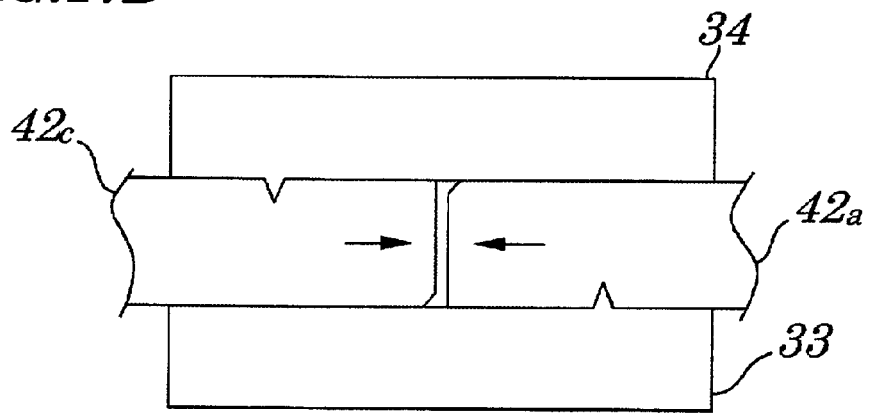
Figure 17C:
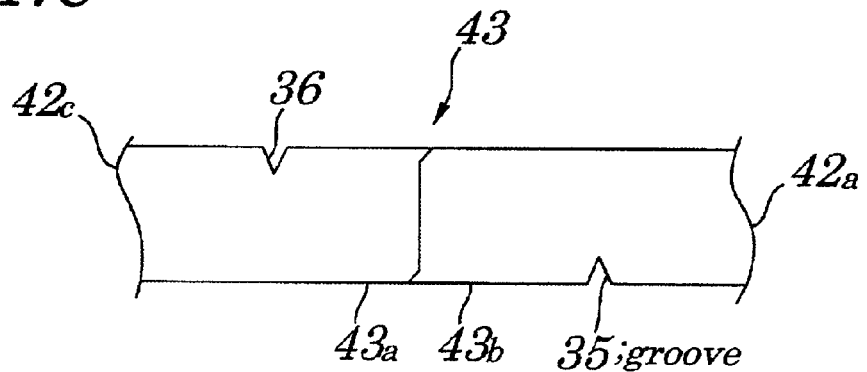

FIGS. 17A, 17B, and 17C are process diagrams showing a method for fabricating a front frame 41 of a fourth embodiment of the present invention. In FIGS. 17A, 17B, and 17C, same reference numbers are assigned to corresponding parts having same functions as those in FIGS. 15A, 15B, and 15C. In FIGS. 17A, 17B, and 17C, instead of a lower metal mold 29 and an upper metal mold 30 shown in FIG. 15, a lower metal mold 33 and an upper metal mold 34 are newly provided. As a material for the lower and upper molds 33 and 34, hardened steel called alloyed tool steel is generally used. On an upper surface of the lower metal mold 33 is formed a line-shaped projected portion $33_a$ in a position being opposite to an L-shaped component member $42_c$ and in parallel to an end face of the L-shaped component member $42_c$ at a place being apart from an end face of the L-shaped component member $42_c$ by a specified distance. On both sides of a root of the line-shaped projected portion $33_a$, a portion having a radius R is formed. On the other hand, on a lower surface of the upper metal mold 34 is formed a line-shaped projected portion $34_a$ in a position being opposite to the L-shaped component member $42_c$ and in parallel to the end face of the L-shaped component member $42_c$ at a place being apart from the end face of the L-shaped component member $42_c$ by a specified distance. On both sides of the root of the line-shaped projected portion $33_a$, a portion having a radius R is formed. A height of each of the line-shaped projected portions $33_a$ and $33_b$, when a thickness of each of a shaped component member $42_a$, an I-shaped component member $42_b$, and the L-shaped component member $42_c$ is 0.4 mm to 1.0 mm, is 0.2 mm to 0.3 mm. Generally, the height is preferably 20% to 30% of the thickness of the component member. Moreover, the ⊐-shaped component member $42_a$, the I-shaped component member $42_b$, and the L-shaped component member $42_c$ themselves are manufactured in the same method employed in the above third embodiment.

Next, a method for fabricating the front frame 41 will be described by referring to FIGS. 17A, 17B, and 17C. First, in a fitting/coupling section 43 between the ⊐-shaped component member $42_a$ and the L-shaped component member $42_c$ as shown in FIGS. 17A, the ⊐-shaped component member $42_a$ is placed face to face with the L-shaped component member $42_c$ in such a manner that a shear droop 27 of the ⊐-shaped component member $42_a$ faces a burr 28 of the L-shaped component member $42_c$ and the burr 28 of the ⊐-shaped component member $42_a$ faces the shear droop 27 of the L-shaped component member $42_c$ and then both the ⊐-shaped component member $42_a$ and the L-shaped component member $42_c$ are put on the lower metal mold 33 and the upper metal mold 30 is put on both the ⊐-shaped component member $42_a$ and the L-shaped component $42_c$. When the ⊐-shaped component member $42_a$ is placed face to face with the L-shaped component member $42_c$ there is a clearance having a width of about 0.05 mm to 0.10 mm between the ⊐-shaped component member $42_a$ and the L-shaped component member $42_c$ in the fitting/coupling section 43.

Next, as shown by arrows in FIG. 17B, while a force is being applied to each of the ⊐-shaped component member $42_a$ and the L-shaped component member $42_c$ so that end portions of the ⊐-shaped component member $42_a$ and the L-shaped component member $42_c$ are pushed towards each other, the upper metal mold 34 is put on the ⊐-shaped component member $42_a$ and the L-shaped component member $42_c$ with force being applied to them. In this case, the force used for pushing the upper metal mold 34 is, for example, about 10 tons and time during which pressing is made by the upper metal mold 34 is, for example, about one second. This causes the line-shaped projected portion $33_a$ to be cut into the ⊐-shaped component member $42_a$ and, at the same time, the line-shaped projected portion $34_a$ to be cut into the L-shaped component member $42_c$. As a result, since the line-shaped projected portion $33_a$ is provided with the portion having a radius R, a part of the ⊐-shaped component member $42_a$ being equivalent to a volume of the line-shaped projected portion $33_a$ and the burr 28 moves smoothly toward the shear droop 27 in the L-shaped component member $42_c$ and the burr 28 cuts into the shear droops 27 in the L-shaped component member $42_c$, while a part of the L-shaped component member $42_c$ being equivalent to a volume of the line-shaped projected portion $34_a$ and the burr 28 move smoothly toward the shear droop 27 in the ⊐-shaped component member $42_a$ and the burr 28 cuts into the shear droop 27 in the ⊐-shaped component member $42_a$. Therefore, as shown in FIG. 17C, the convex portion 43 and concave portion $43_b$ are fitted each other in a mechanical manner. At this point, the line-shaped projected portion $33_a$ cuts into the lower surface of the ⊐-shaped component member $42_a$ and the line-shaped projected portion $34_a$ cuts into the upper surface of the L-shaped component member $42_c$ and, as a result, grooves 35 and 36 each having an approximately V-shaped cross section are formed in a position being approximately symmetric with respect to a point in the fitting/coupling section 43, as shown in FIG. 17C. Next, after the processes shown in FIGS. 17A, 17B, and 17C have been performed on a fitting/coupling section 44 between the ⊐-shaped component member $42_a$ and the L-shaped component member $42_c$ and on a fitting/coupling section 45 between the I-shaped component member $42_b$ and the L-shaped component member $42_c$, as in the case of the above second conventional example, a bending margin of each side is bent using a pressing machine. As a result, the front frame 41 having the same shape as a front frame 2 shown in FIG. 29 is manufactured. Moreover, a center frame 3 can be manufactured by approximately the same method as described.

Thus, according to the method of the fourth embodiment, since the line-shaped projected portions $33_a$ and $34_a$ on the lower metal mold 33 and the upper metal mold 34 respectively in a manner to be symmetric with respect to a point, the line-shaped projected portion $33_a$ moves the burr 28 in the ⊐-shaped component member $42_a$ toward the shear droop 27 in the L-shaped component member $42_c$ and causes the burr 28 to be cut into the shear droop 27 in the L-shaped component member $42_c$, while the line-shaped projected portion $34_a$ moves the burr 28 in the L-shaped component member $42_c$ toward the shear droop 27 in the ⊐-shaped component member $42_a$ and causes the burr 28 to be cut into the shear droop 27 in the ⊐-shaped component member $42_a$. As a result, the fitting/coupling sections 43 and 45 can be fitted in each other and coupled to each other more reliably compared with the case of the third embodiment. This causes the strength of the fitting/coupling sections 43 and 45 to be greater than compared with the case of the third embodiment.

Fifth Embodiment

Figure 18:
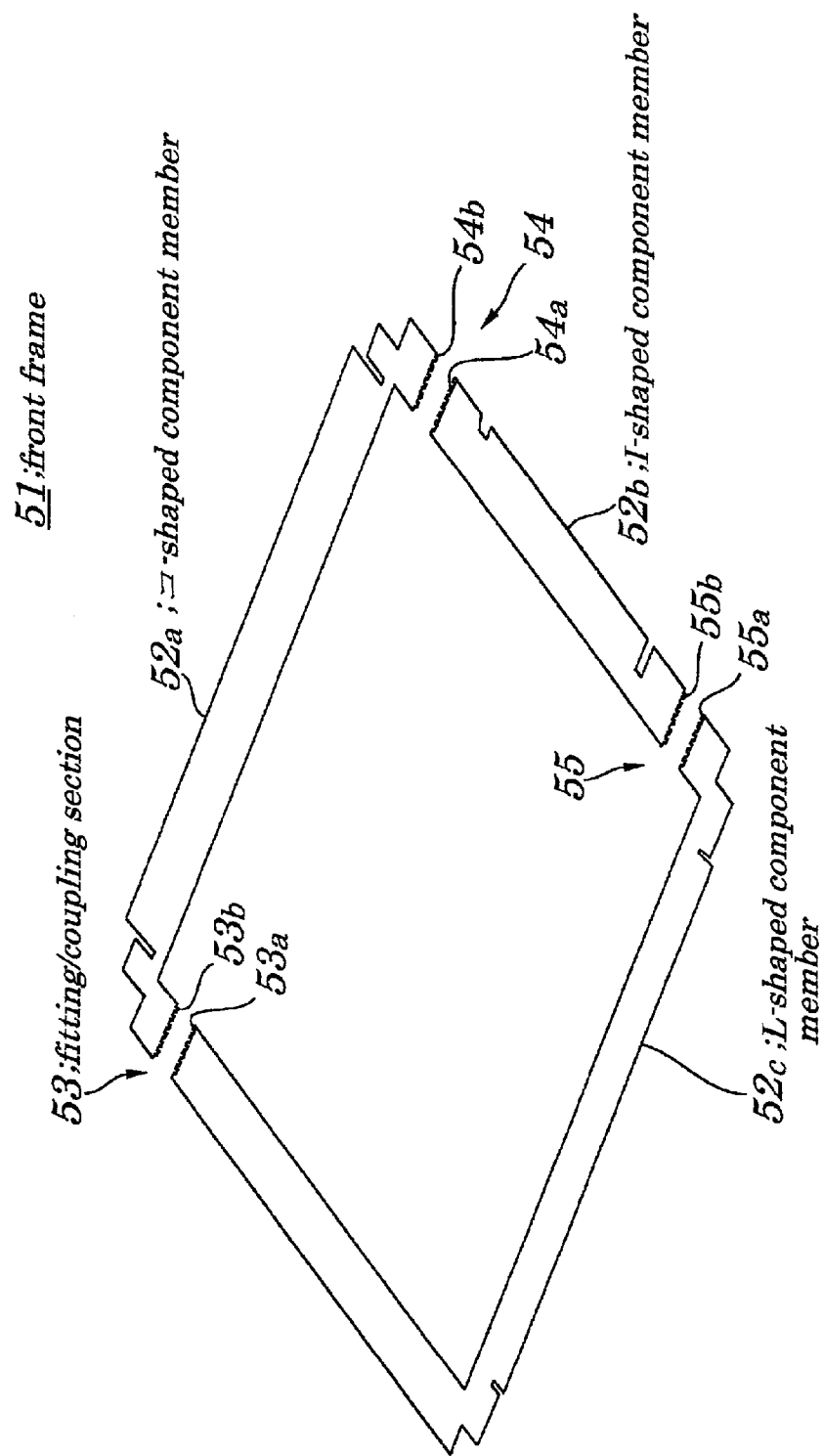
FIG. 18 is an exploded perspective view, in a developed state, of a ⊐-shaped component member, an I-shaped component member, and an L-shaped component member, all of which make up a front frame of a fifth embodiment of the present invention.

FIG. 18 is an exploded perspective view of a ⊐-shaped component member $52_a$, an I-shaped component member $52_b$ and an L-shaped component member $52_c$, all of which make up a front frame 51 of a fifth embodiment of the present invention.

The front frame 51 of the fifth embodiment is assembled so as to have an approximately □-shaped configuration and is made up of the approximately ⊐-shaped component member $52_a$ making up its upper portion, the approximately I-shaped component member $52_b$ making up its right side portion, and the approximately L-shaped component member $52_c$ making up its left side portion and its lower portion. Moreover, a fitting/coupling section 53 having trapezoidal convex portions $53_a$ and trapezoidal concave portions $53_b$ is provided at a place where the ⊐-shaped component member $52_a$ is coupled to the approximately L-shaped component member $52_c$; a fitting/coupling section 54 having trapezoidal convex portions $54_a$ and trapezoidal concave portions $54_b$ is provided at a place where the ⊐-shaped component member $52_a$ is coupled to the approximately I-shaped component member $52_b$ and a fitting/coupling section 55 having trapezoidal convex portions $55_a$ and trapezoidal concave portions $55_b$ is provided at a place where the approximately I-shaped component member $52_b$ is coupled to the approximately L-shaped component member $52_c$. Configurations of the fitting/coupling sections 53 to 55 are the same as those shown in FIG. 10 and their descriptions are omitted.

Furthermore, as a material for the component members $52_b$, $52_c$ other than the ⊐-shaped component member $52_a$, stainless steel is preferably used. On the other hand, since TCPs $6_1$ to $6_8$ and/or printed board 4 (see FIG. 29) are disposed below the ⊐-shaped component member $52_a$, as a material for the ⊐-shaped component member $52_a$, a substance having high conductivity such as a resin obtained by painting or spraying conductive paint being a high-conductive material having its volume fixed resistance of as low as $10^{-3}$ □/cm to $10^0$ □/cm only on an upper surface of the ⊐-shaped component member $52_a$ or a resin obtained by depositing metals as described above such as copper or aluminum or a like only on the upper surface of the ⊐-shaped component member $52_a$ or by plating only its upper surface with these metals, is used in order to prevent an EMI.

Next, a method for fabricating the front frame 51 will be explained. After the ⊐-shaped component member $52_a$ itself has been manufactured by a normal resin forming method, processing including the painting, spraying, depositing, plating or a like described above is performed only on the upper surface of the ⊐-shaped component member $52_a$. On the other hand, the I-shaped component member $52_b$ and the L-shaped component member $52_c$ themselves are manufactured by the same method as employed in the third conventional example.

Next, fitting and coupling processing in the fitting/coupling section 55, out of the fitting/coupling sections 53 to 55 shown in FIG. 18, is performed by the same method as employed in the third or fourth embodiments. Fitting and coupling processing in the fitting/coupling sections 53 and 54 is performed by the fabricating method shown in FIGS. 19A, 19B, and 19C. As a material for a lower metal mold 56 and an upper metal mold 57 shown in FIGS. 19A, 19B, and 19C, hardened steel called alloyed tool steel is generally used. Unlike in the case of the third and fourth embodiments, no line-shaped projected portion is formed on the lower metal mold 56. The reason is because a burr 28 of the ⊐-shaped component member $52_a$ cuts into a shear droop 27 of the L-shaped component member $52_c$ only by pressing force of the upper metal mold 57 due to flexibility of the resin even if the resin is not moved by a line-shaped projected portion and because a risk of a crack on a surface of the resin caused by the intrusion of the line-shaped portion has to be avoided. On the other hand, on a lower surface of the upper metal mold 57 is formed a line-shaped projected portion $57_a$ in a position being opposite to the L-shaped component member $52_c$ and in parallel to an end face of the L-shaped component member $52_c$ at a place being apart from the end face of the L-shaped component member $52_c$ by a specified distance. On both sides of a root of the line-shaped projected portion $57_a$, a portion having a radius R is formed. A height of each of the line-shaped projected portions $57_a$, when a thickness of each of the L-shaped component member $52_c$ is 0.4 mm to 1.0 mm, is 0.2 mm to 0.3 mm. Generally, the height is preferably 20% to 30% of the thickness of the L-shaped component member $52_c$.

Figure 19A:
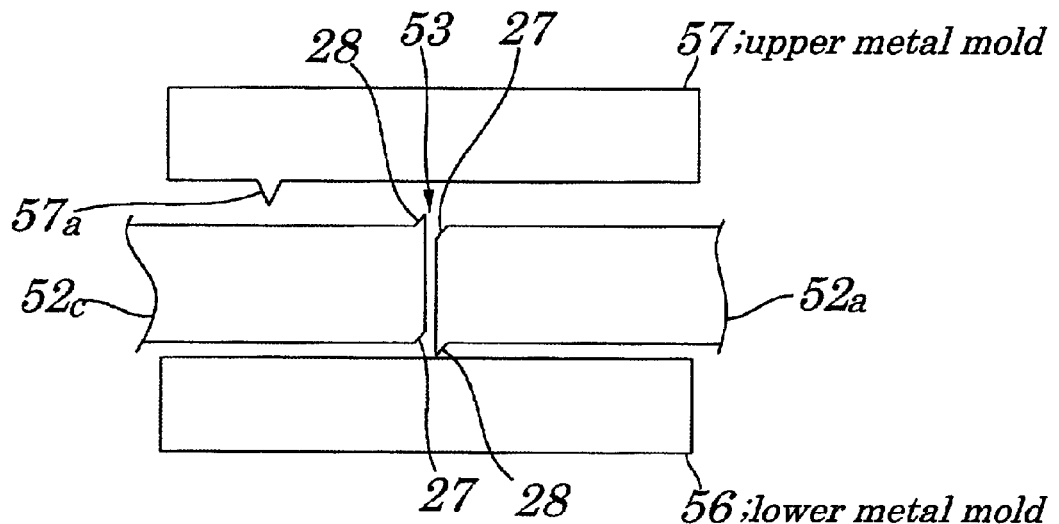
FIGS. 19A, 19B, and 19C are process diagrams showing a method for fabricating the front frame of a fifth embodiment of the present invention.

First, in the fitting/coupling section 53 between the ⊐-shaped component member $52_a$ and the L-shaped component member $52_c$, as shown in FIG. 19A, the ⊐-shaped component member $52_a$ is placed face to face with the L-shaped component member $52_c$ in such a manner that the shear droop 27 of the ⊐-shaped component member $52_a$ faces the burr 28 of the L-shaped component member $52_c$ and the burr 28 of the ⊐-shaped component member $52_a$ faces the shear droop 27 of the L-shaped component member $52_c$ and then both the ⊐-shaped component member $52_a$ and the L-shaped component member $52_c$ are put on the lower metal mold 56 and the upper metal mold 57 is put on both the ⊐-shaped component member $52_a$ and the L-shaped component member $52_c$. When the ⊐-shaped component member $52_a$ is placed face to face with the L-shaped component member $52_c$ there is a clearance having a width of about 0.05 mm to 0.10 mm between the ⊐-shaped component member $52_a$ and the L-shaped component member $52_c$ in the fitting/coupling section 53.

Figure 19B:
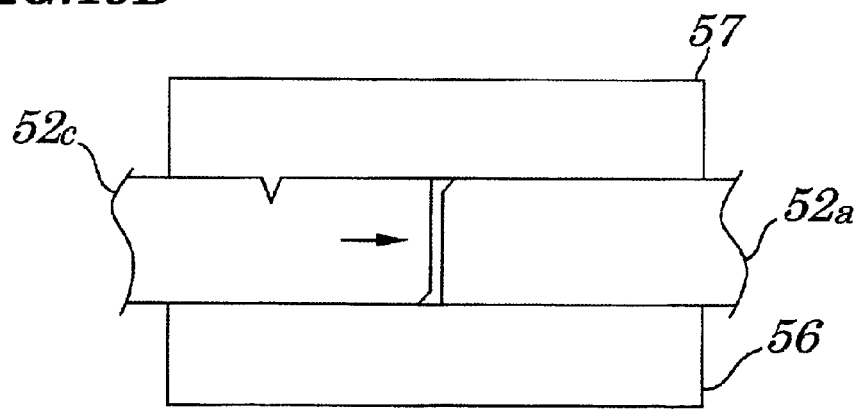

Next, as shown by arrows in FIG. 19B, while a force is being applied both the ⊐-shaped component member $52_a$ and the L-shaped component member $52_c$ in the fitting/coupling section 53 SO that an end portion of the L-shaped component member $52_c$ is pushed to an end portion of the ⊐-shaped component member $52_a$, the upper metal mold 57 is put on the L-shaped component member $52_c$ and the ⊐-shaped component member $52_a$ with force being applied to them. In this case, the force used for pushing the upper metal mold 57 is, for example, about 10 tons and time during which pressing is made by the upper metal mold 57 is, for example, about one second. Moreover, in this embodiment, unlike in the case of the third and fourth embodiments, the end portion of the ⊐-shaped component member $52_a$ is not pushed to the end portion of the L-shaped component members $52_c$. The reason is because it is necessary to prevent deformation or bending in the ⊐-shaped component member $52_a$ that may occur due to pressing on the ⊐-shaped component member $52_a$ more than needed.

Figure 19C:
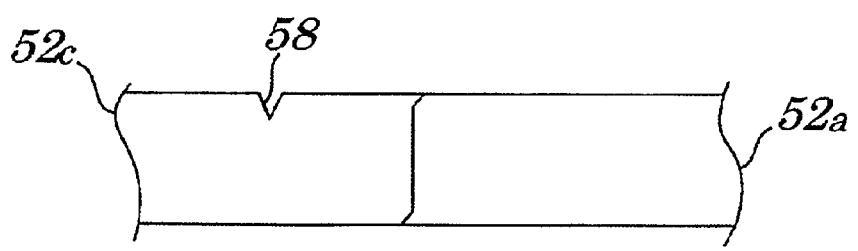

This causes the line-shaped projected portion $57_a$ to be cut into the L-shaped component member $52_c$ and, since a portion having a radius R is formed in the line-shaped projected portion $57_a$; a part of the L-shaped component member $52_c$ being equivalent to a volume of the line-shaped projected portion $57_a$ and the burr 28 move smoothly toward the shear droop 27 of the ⊐-shaped component member $52_a$ and the burr 28 cuts into the shear droop 27 of the ⊐-shaped component member $52_a$. On the other hand, the burr 28 of the ⊐-shaped component member $52_a$ moves to the shear droop 27 of the L-shaped component member $52_a$ and cuts smoothly into the shear droop 27. Therefore, as shown in FIGS. 18 and 19C, the convex portion 53 and concave portion $53_b$ are fitted each other in a mechanical manner. At this point, the line-shaped projected portion $57_a$ cuts into the upper surface of the L-shaped component member $52_c$ and, as a result, a groove 58 having an approximately V-shaped cross section is formed in a position being apart from an end portion of the fitting/coupling section 53 by a specified distance on the surface of the L-shaped component member $52_c$.

Next, after the processes shown in FIGS. 19A, 19B, and 19C have been performed on the fitting/coupling section 54 between the ⊐-shaped component member $52_a$ and the I-shaped component member $5_b$, as in the case of the above second conventional example, a bending margin of each side is bent using a pressing machine. As a result, the front frame 51 having the same shape as the front frame 2 shown in FIG. 29 is manufactured.

Moreover, the prevention against the EMI is not required for the center frame 3. Therefore, the center frame 3 can be manufactured by assembling it so as to have an approximately □-shaped configuration using two L-shaped component members (not shown) each end portion of which exists in a position being slightly apart from each of the corner portions in a manner so as to have an approximately L-shaped configuration and by performing processes shown in FIGS. 15A to 15C employed in the third embodiment on fitting-type coupling corners at two places.

Thus, according to the method of the fifth embodiment, since the conductive resin is used only for the upper frame portion of the front frame 51 where countermeasures against the EMI has to be taken, a weight of the display device can be made less than compared with a case where iron is used for an entire configuration of the front frame 51 and easy processing is made possible.

Also, according to the method of the fifth embodiment, costs of the display device can be reduced compared with a case where expensive aluminum is used for the entire configuration of the front frame 51.

Moreover, according to the method of the fifth embodiment, since the component counts and the number of processes can be reduced compared with the case where stainless steel is used for the entire configuration of the front frame 51 and copper foil is pasted on a lower face of its upper frame portion, costs of the display device can be reduced.

Additionally, according to the method of the fifth embodiment, the material for the ⊐-shaped component member $52_a$ is the resin serving as an insulator and conductivity is provided only on the surface of the ⊐-shaped component member $52_a$. Therefore, when compared with a case where an insulator such as silicon rubber or a like is pasted on a lower surface of an upper frame portion of a front frame as is in the conventional case, since the component counts and the number of processes can be reduced, costs of the display device can be decreased.

Sixth Embodiment

Figure 20:
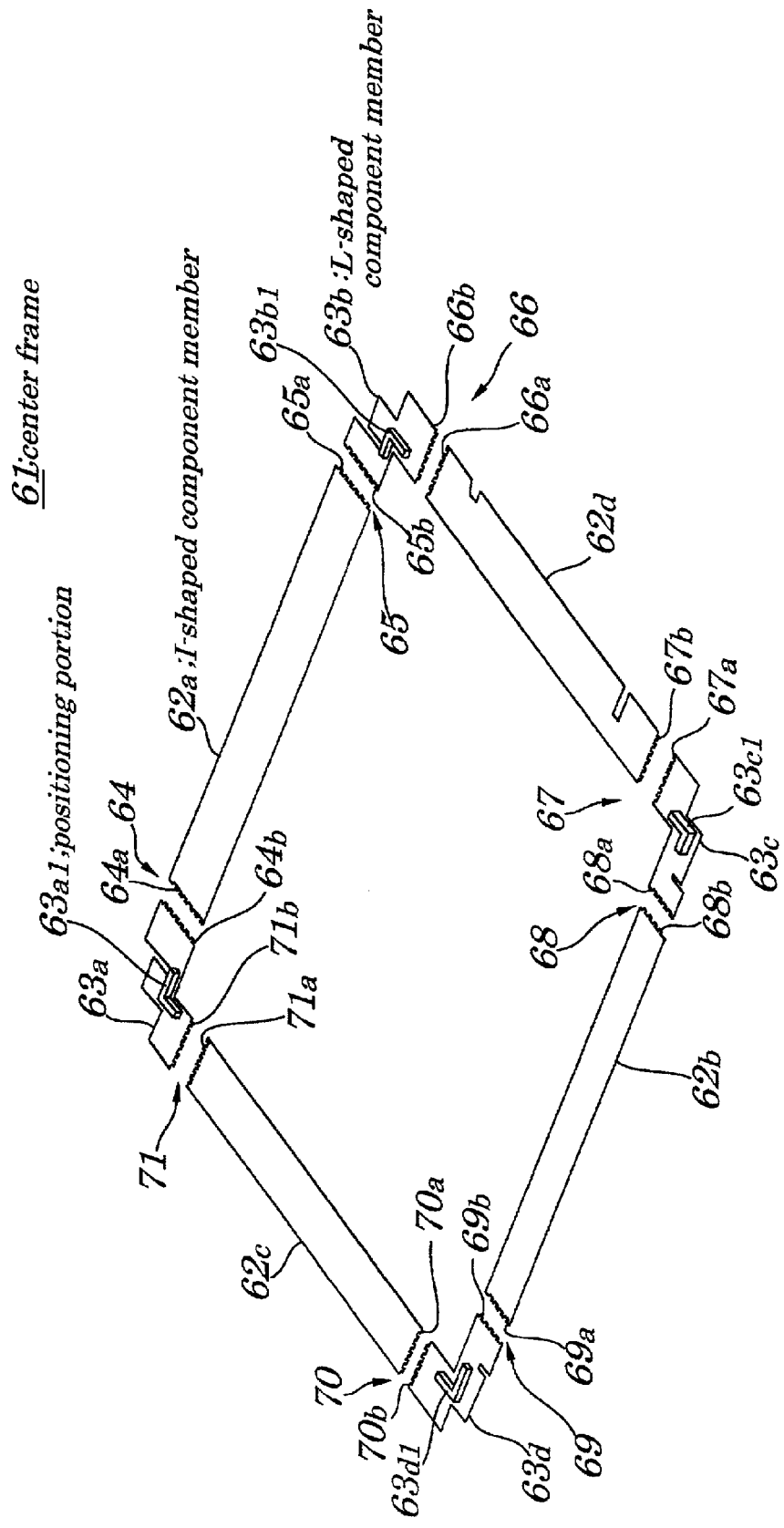
FIG. 20 is an exploded perspective view, in a developed state, of I-shaped component members and L-shaped component members both making up a center frame of a sixth embodiment of the present invention.

FIG. 20 is an exploded perspective view, in a developed state, of I-shaped component members $62_a$ to $62_d$ and L-shaped component members $63_a$ to $63_d$ both making up a center frame 61 of a sixth embodiment of the present invention.

The center frame 61 of the sixth embodiment is assembled so as to have an approximately □-shaped configuration and is made up of approximately I-shaped component members $62_a$ to $62_d$ constituting its side portions and approximately L-shaped component member $63_a$ to $63_d$ making up its corner portions. On an upper portion of each of the L-shaped component members $63_a$ to $63_d$ is formed each of approximately L-shaped positioning portions $63_{a1}$ to $63_{d1}$ which is used to precisely attach an LCD module 1 to a predetermined position of the center frame 61. At each end portion being a place where each of the I-shaped component members $62_a$ to $62_d$ is coupled to each of the L-shaped component members $63_a$ to $63_d$, each of fitting/coupling sections 64 to 71 each being made up of a pair of each of trapezoidal convex portions $64_a$, $65_a$, $66_a$, $67_a$, $68_a$, $69_a$, $70_a$ and $71_a$ and each of trapezoidal concave portions $64_b$, $65_b$, $66_b$, $67_b$, $68_b$, $69_b$, $70_b$ and $71_b$ is provided. Moreover, configurations of each of the fitting/coupling sections 64 to 71 are the same as the fitting/coupling section 45 shown in FIG. 10 and their descriptions are omitted accordingly. In the embodiment, as a material for the I-shaped component members $62_a$ to $62_d$, stainless steel is preferably used. As a material for the L-shaped component members $63_a$ to $63_d$, a resin is used.

Next, a method for fabricating the center frame 61 is described below. The I-shaped component members $62_a$ to $62_d$ themselves are fabricated by the same method as employed in the third embodiment. The L-shaped component members $63_a$ to $63_d$ themselves are fabricated by a normal resin forming method. Fitting and coupling in each of the fitting/coupling sections 64 to 71 shown in FIG. 20 is performed by the same method as employed in the fifth embodiment. Then, as in the second conventional example, by using a pressing machine, a bending margin at each side is bent. As a result, the center frame 61 having approximately the same shape as a center frame 3 shown in FIG. 29 is manufactured.

Moreover, prevention against EMI is not required for the front frame. The front frame can be manufactured by assembling it so as to have an approximately □-shaped configuration using two L-shaped component members (not shown) each end portion of which exists in a position being slightly apart from each of the corner portions in a manner so as to have an approximately L-shaped configuration and by performing processes shown in FIGS. 15A to 15C employed in the third embodiment on fitting-type coupling corners at two places.

Thus, according to the method of the sixth embodiment, each of the L-shaped component members $63_a$ to $63_d$ made from a resin each having each of the approximately L-shaped positioning portion $63_{a1}$ to $63_{d1}$ is formed at four corners in the center frame 61 and, therefore, component counts and the number of processes can be reduced compared with a case where a positioning member 7 is separately used, which can reduce costs of the display device.

Also, according to the method of the sixth embodiment, since the center frame 61 is made up of four pieces of the I-shaped component members ($62_a$ to $62_d$) and four pieces of the L-shaped component members ($63_a$ to $63_b$), only by changing a length of each of the four I-shaped component members $62_a$ to $62_d$, the center frame 61 can be applied to a display panel having a different display area, which can provide general versatility. Moreover, this enables a lower metal mold and an upper metal mold to be applied commonly in a same way.

Figure 21:
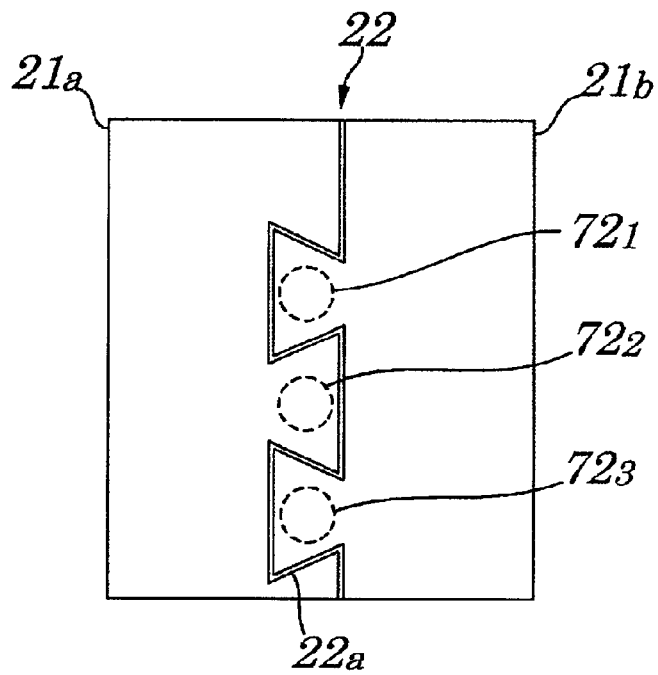
FIG. 21 is a top view explaining a first modified example of the present invention.
Figure 22:
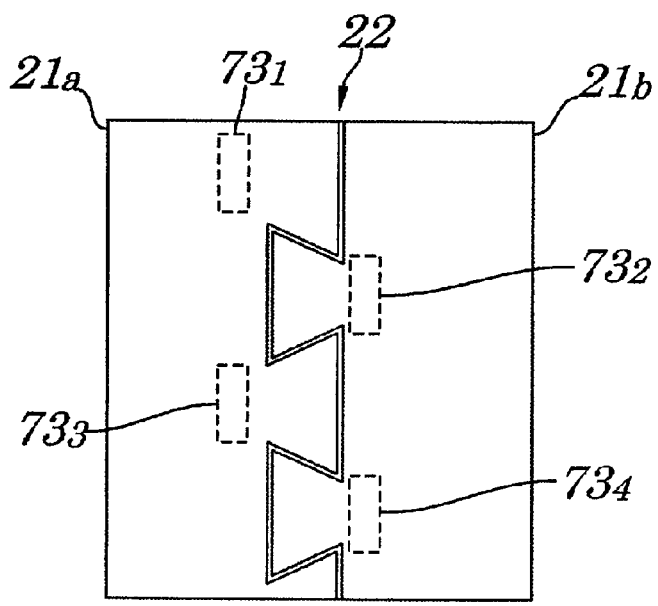
FIG. 22 is a top view explaining a second modified example of the present invention.
Figure 23:
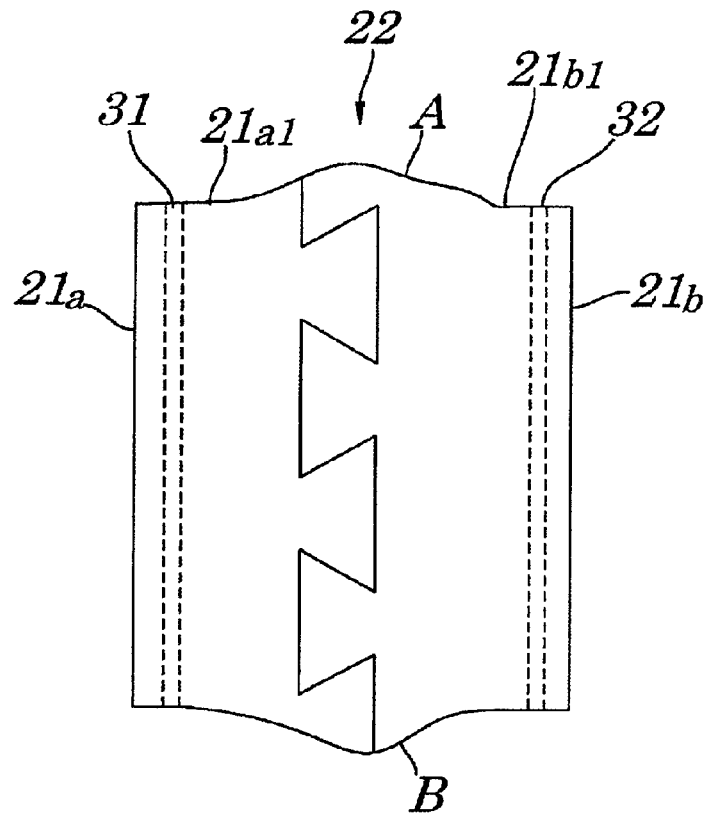
FIG. 23 is a top view explaining a problem that may occur in a display frame fabricated in each of the embodiments of the present invention.

It is apparent that the present invention is not limited to the above embodiments but may be changed and modified without departing from the scope and spirit of the invention. For example, in the above embodiments, examples are shown in which a line-shaped projected portion is formed on both an lower metal mold and an upper metal mold or on one of the lower metal mold and the upper metal mold so that a burr of one component member moves smoothly to a shear droop of another component member and the burr cuts into the shear droop of another component member and a groove having an approximately V-shaped cross section is formed in the vicinity of a fitting/coupling section at a time of fitting and coupling of the component members, however, the present invention is not limited to the configuration. That is, as shown in FIG. 21, each of conical holes $72_1$ to $72_3$ may be formed in a position corresponding to an approximate center of a convex portion $22_a$ in a fitting/coupling section 22. Moreover, as shown in FIG. 22, each of pyramidal holes may be formed at a position corresponding to an approximate root of the convex portion $22_a$ in the fitting/coupling section 22. Furthermore, as shown in FIG. 23, by forming grooves 31 and 32 each having an approximately V-shaped cross section in the vicinity of the fitting/coupling section 22, unwanted deformation or a like caused by extrusion (A and B portions in FIG. 23) of end faces $21_{a1}$ and $21_{b1}$ of L-shaped component members $21_a$ and $21_b$ intersecting the fitting/coupling section 22 at right angles can be minimized.

Figure 24:
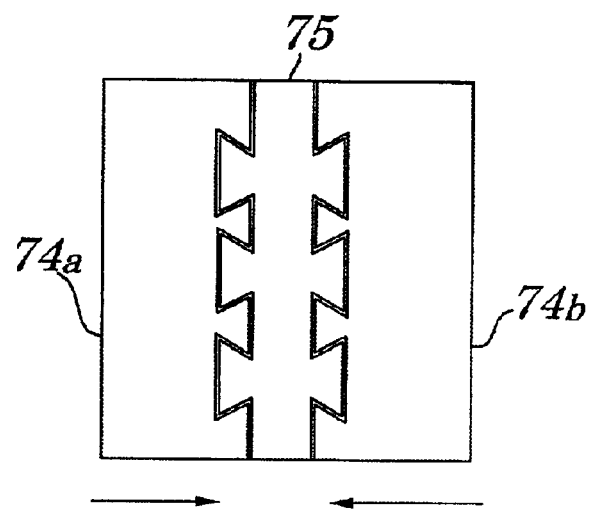
FIG. 24 is a top view explaining a third modified example of the present invention.
Figure 25:
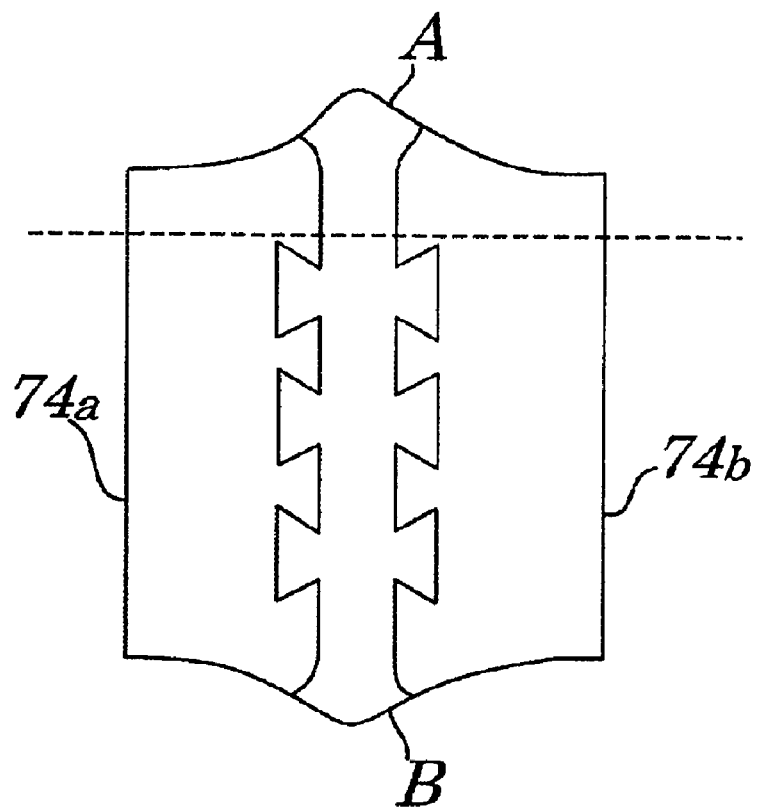
FIG. 25 is a top view explaining a problem that may occur in a display frame fabricated in the third modified example.

Moreover, in the above embodiments, the fitting/coupling section is formed only by component members disposed so as to be opposite of each other, however, the present invention is not limited to this configuration. For example, as shown in FIG. 24, fitting and coupling of component members $74_a$ and $74_b$ each being made of a material having high hardness such as iron may be performed by using a fitting/coupling member 75 made of a material having low hardness such as aluminum. By configuring as above, a greater part of the display frame can be configured using iron, which is inexpensive; but is difficult to be worked. At a time of fitting and coupling, as shown in FIG. 24, if the fitting/coupling member 75 is pressed by both the component members $74_a$ and $74_b$, as shown in FIG. 25, since hardness of the fitting/coupling member 75 is low, there is a danger that the fitting-coupled member 75 extrudes more compared with the case shown in FIG. 23 (A and B portions in FIG. 25). Therefore, after the fitting and coupling process is performed by using a jig so that the fitting/coupling member 75 should not extrude out of side faces of the component members $74_a$ and $74_b$ making up an outside portion of the display frame, portions indicated by broken lines in side faces of the component members $74_a$ and $74_b$ making up an inside portion of the display frame may be cut so that a width of the display frame can have a dimension as designed as shown in FIG. 25. To achieve this, the dimension of the extrusion is predicted in advance and the width of the display frame is set to be a little larger than originally designed. Moreover, the use of the jig is used commonly in the first to sixth embodiments in a same way.

Figure 26:
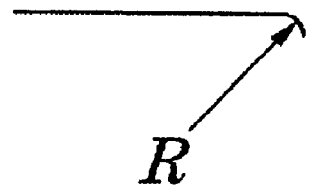
FIG. 26 is a schematic diagram explaining a configuration of a corner portion when an inside portion of a display frame is cut after fitting and coupling for the display frame completed according to the first to sixth embodiments and modified examples of the present invention.

The reason that such the fitting and coupling processing described above is required is as follows. That is, since the inside portion of the display frame is in contact with an LCD panel, dimensional specifications for the inside portion of the display frame are more rigorous than that for its outside portion. Therefore, conventionally, after fabrication of the display frame having an approximately □-shaped configuration has been completed, such a portion as indicated by broken lines in FIG. 25 in end faces (A portion in FIG. 25) of the component members $74_a$ and $74_b$ making up the inside portion of the display frame is cut so that a width of the display frame can have a dimension as designed. Thus, since the process of cutting an inside portion of the display frame is employed conventionally and originally, no inconvenience occurs if the fabrication method described above is used in the above embodiments. Moreover, when such the portion as indicated by broken lines in FIG. 25 is cut after the fitting and coupling process has been performed on the display frame, a portion having a radius R (for example, 0.5 mm) as shown in FIG. 26 is provided at a corner of the display frame. An aim of this process is to prevent an abrasion of a metal mold used for cutting and to enhance strength of the display frame. The process of forming a portion having a radius R in an inside of a corner is applied commonly in the same way in the case where the cutting is made after the fitting and coupling processing has been performed in each of the above embodiments and in the case where the ⊐-shaped component member or the L-shaped component member itself is fabricated.

Moreover, by forming various projected portions in a position corresponding to a position of the fitting and coupling member on either of the above upper or lower metal mold or on both of them and by fixing two pieces of the component members at the time of fitting and coupling, unlike in the case of above embodiments, unwanted deformation caused by extrusion of component members or a like can be minimized.

Figure 27:
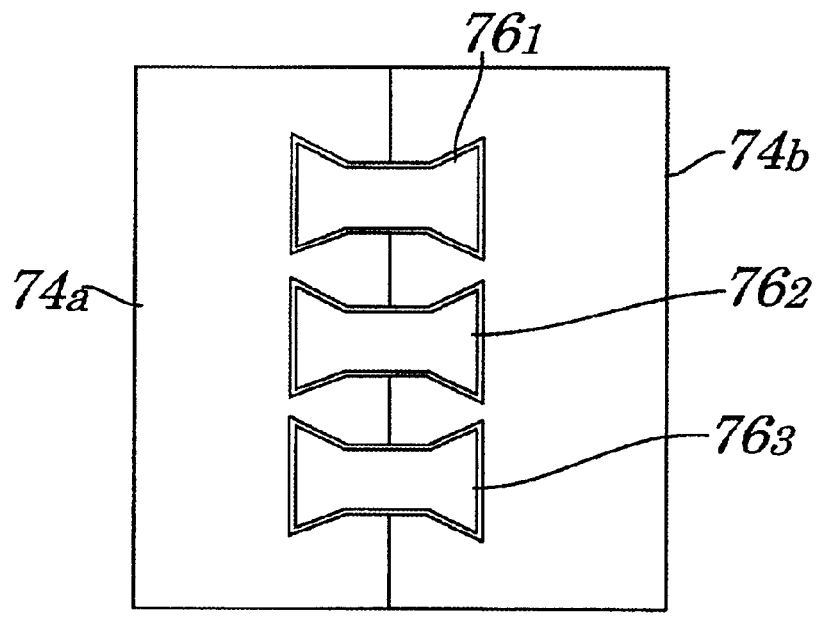
FIG. 27 is a top view explaining a fourth modified example of the present invention.

Also, a shape of the fitting/coupling member is not limited to that shown in FIG. 24 and, for example, a shape of the fitting/coupling members $76_1$ to $76_3$ shown in FIG. 27 may be employed.

Also, if a part of a display frame has to be formed so as to be more slender than other parts, in order to maintain its strength, a component member, a slender part of which, is made of a material having high strength may be used. That is, for example, when the display frame is configured by using iron and aluminum, iron is used only in slender parts of the component member and aluminum is used in other parts and the component member made of iron and the component member made of aluminum are fitted and coupled by the fabrication methods described in the above embodiments. By configuring as above, strength can be enhanced partially. In each of the above embodiments, it is presumed that a thickness of each of the component members is same, however, the present invention is not limited to this and can be applied to a case where component members each having a different thickness. As a result, it is possible to use a component member having a small thickness only in portions where a sufficient distance between a display frame and other components cannot be provided by limitation imposed at a time of designing a display device. This enhances freedom of designing.

Figure 31:
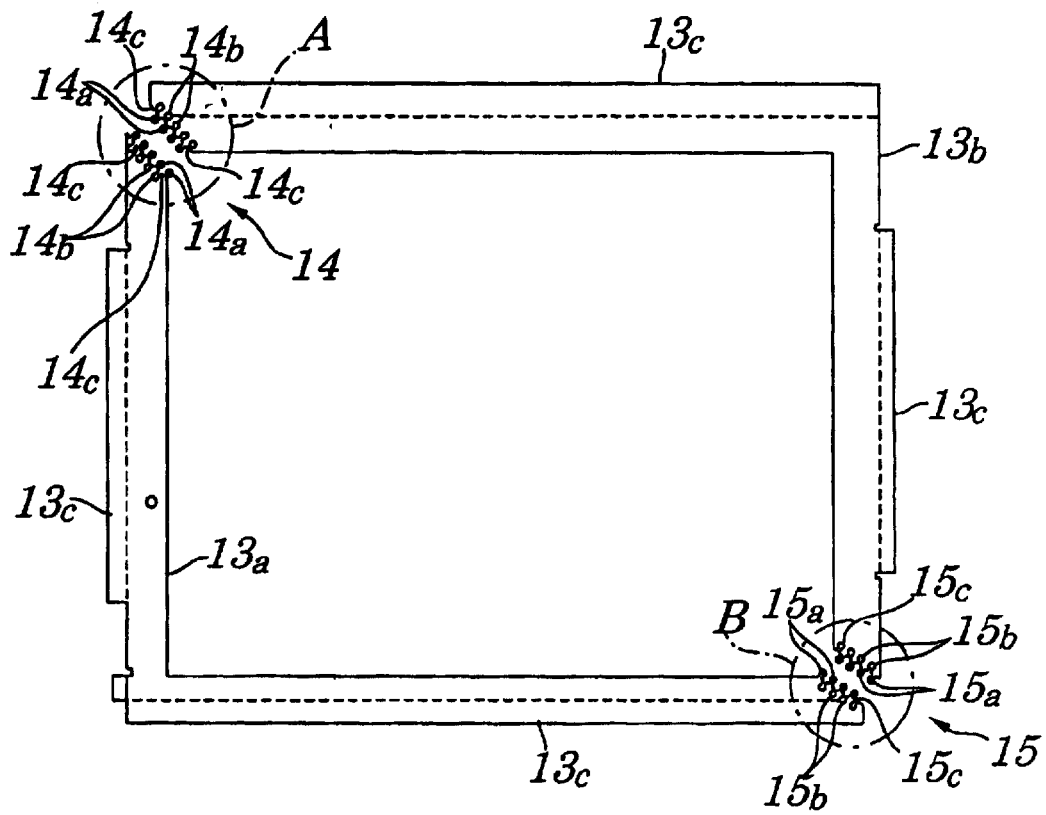
FIG. 31 is an exploded plan view showing component members making up the center frame in a developed state employed in another conventional example.
Figure 32A:
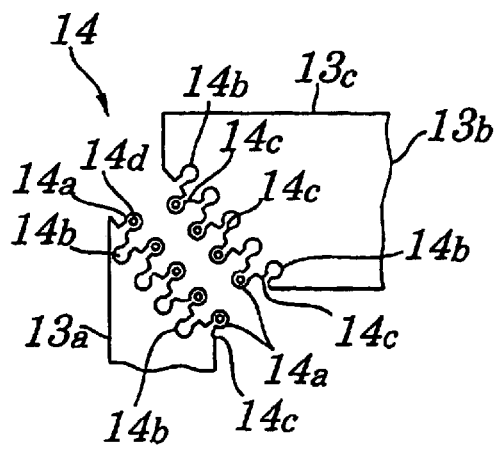
FIG. 32A is a partially expanded diagram of an end portion A of the center frame in FIG. 31
Figure 32B:
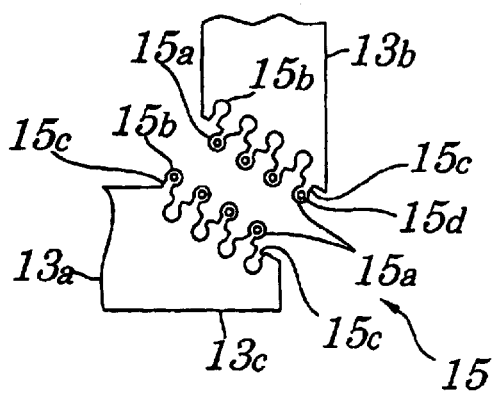
FIG. 32B is a partially expanded diagram of an end portion B of the center frame in FIG. 31.
Figure 33:
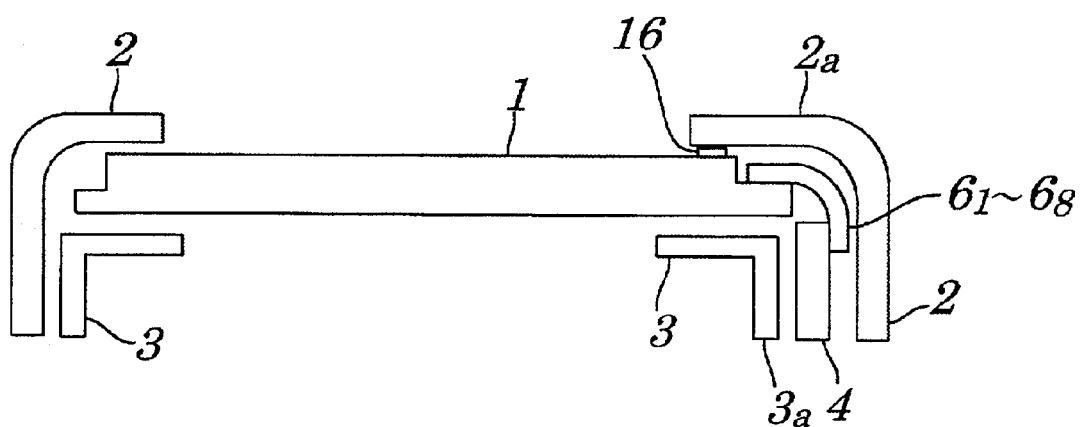
FIG. 33 is a right cross-sectional view showing a state in which the conventional display device of FIG. 29 is assembled.

Also, in the first to fifth embodiments, an end face of each of the L-shaped component members is disposed in a position being slightly apart from each of corners, however, each of the L-shaped component members, as in the case of the second conventional example shown in FIG. 31, may be disposed at each of the corners.

Figure 28:
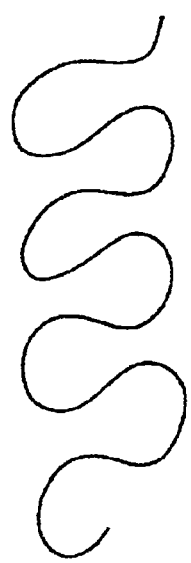
FIG. 28 is a schematic diagram illustrating another shape of convex and concave portions making up a fitting/coupling section.

Also, in each of the above embodiments, an example is shown in which each of the convex portions and the concave portions has an approximately trapezoidal configuration, however, it may have, for example, an approximately figure-8-shaped configuration as shown in FIG. 28. Any shape of the convex and concave portion may be employed so long as it can provide easiness of working and of fitting and coupling and can meet conditions imposed from a point of strength of a display frame to be obtained after being fitted and coupled and so long as it is bilaterally symmetrical. However, if it is rectangular, there is a danger that the convex and concave portions may repel each other, causing unreliable fitting and coupling. Moreover, an experiment indicates that there is no correlation among a size of the convex and concave portions, a material, thickness, and strength of the component members and pressing force and pressing time used at a time of fitting and coupling and, therefore, changing of the shape of the convex and concave portions is not required even if the material, thickness, and strength of the component members and pressing force and pressing time used at a time of fitting and coupling are changed.

Also, in each of the above embodiments, each of the fitting/coupling sections is fitted and coupled individually and separately, however, all the fitting/coupling sections may be fitted and coupled at one time. This can reduce manufacturing processes and can lower costs of display frames and display devices.

Also, in each of the above embodiments, the metal mold used for fabricating each of the component members and the metal mold for fitting and coupling the component members are provided separately and individually, however, one metal mold that can serve as the metal mold having the functions described above may be employed. This can reduce the number of metal molds to be used and can lower costs of display frames and display devices.

Also, in each of the third to fifth embodiments, since it is presumed that the TCPs $6_1$ to $6_8$ are mounted only on the LCD module 1, an example is shown in which a metal having high conductivity is used only for the upper frame portion of the front frame or a conductive resin is used only for the upper face of the upper frame portion of the front frame, however, the metal having high conductivity may be employed only for a lower frame portion, both the upper and lower frame portions, or either of a right frame portion and left frame portion or both the right and left frame portions each being corresponding to the position of each of the TCPs $6_1$ to $6_8$ in the LCD module 1 and the conductive resin may be employed only for an upper face of them.

Also, technology disclosed in each of the above embodiment, so long as it does not have contradictory points or problems from a point of the purpose or configurations of the present invention, may be applied commonly to each of the other embodiments.

Moreover, the display frame provided in each of the above embodiments not only bears favorably with that fabricated by the deposition method employed in the first conventional example but also provides easiness of disassembling for recycling.

Furthermore, in each of the above embodiments, an example is shown in which the present invention is applied to LCD panels, however, the present invention may be applied to PDPs, or panels made up of light emitting elements such as ELs, LEDs, VFDs or a like.

What is claimed is:

1. A support frame of a rectangular display panel having an approximately rectangular-shaped configuration and being used to support a portion surrounding said rectangular display panel, comprising:

a plurality of component members each having convex portions and concave portions arranged alternately at an end portion of each of said plurality component members in a manner that each of said convex portions and said concave portion is bilaterally symmetrical and having a shear droop and a burr at an end portion of each of said plurality of component members; and wherein said end portions of said plurality of component members are fitted and coupled by placing said convex portions and said concave portions in such a manner that said shear droop of each of said convex portions faces said burr of each of said concave portions and said burr of each of said convex portions faces said shear droop of each of said concave portions.

2. The support frame of the rectangular display panel according to claim 1, wherein either of two component members to be fitted and coupled to each other out of said plurality of said component members is made of a metal having a different conductivity or made of a resin.

3. The support frame of the rectangular display panel according to claim 2, wherein said component member made of said resin is so configured that conductive paint is painted or sprayed or the metal having high conductivity is deposited or plated only on an upper face of said component member.

4. The support frame of the rectangular display panel according to claim 1, wherein each of said convex portions and said concave portions has an approximately trapezoidal configuration.

5. The support frame of the rectangular display panel according to claim 1, wherein each of said convex portions and said concave portions has an approximately figure-8-shaped configuration.

6. The support frame of the rectangular display panel according to claim 2, wherein a pair of said component members to be fitted and coupled is made of a metal having high hardness and end portions of said pair of said component members made of said metal having high hardness are fitted and coupled with a fitting and coupling member made of a metal having low hardness being interposed between said component members made of said metal having high hardness.

7. A display device equipped with the support frame which supports a rectangular display panel and a portion surrounding said display panel stated in claim 1.

8. A support frame of a rectangular display panel having an approximately rectangular-shaped configuration and being used to support a portion surrounding said rectangular display panel, comprising:

a plurality of component members made of two or more kinds of metals each having a different conductivity or made of a resin each having convex portions and concave portions arranged alternately in a manner that each of said convex portions and said concave portion is bilaterally symmetrical at an end portion of each of said plurality of component members and each having a shear droop and a burr formed at an end portion of each of said plurality of component members; and wherein end portions of two component members to be assembled out of said plurality of said component members are fitted and coupled by placing said convex portions and said concave portions in such a manner that said shear droop of each of said convex portions faces said burr of each of said concave portions and said burr of each of said convex portions faces said shear droop of each of said concave portions.

9. The support frame of the rectangular display panel according to claim 8, wherein said component member made of said resin is so configured that conductive paint is painted or sprayed or the metal having high conductivity is deposited or plated only on an upper face of said component member.

10. The support frame of the rectangular display panel according to claim 8, wherein each of said convex portions and said concave portions has an approximately trapezoidal configuration.

11. The support frame of the rectangular display panel according to claim 8, wherein each of said convex portions and said concave portions has an approximately figure-8-shaped configuration.

12. The support frame of the rectangular display panel according to claim 8, wherein a pair of said component members to be fitted and coupled is made of a metal having high hardness and end portions of said pair of said component members made of said metal having high hardness are fitted and coupled with a fitting and coupling member made of a metal having low hardness being interposed between said component members made of said metal having high hardness.

13. A display device equipped with the support frame which supports a rectangular display panel and a portion surrounding said display panel stated in claim 8.

14. A support frame of a rectangular display panel having an approximately rectangular-shaped configuration and being used to support a portion surrounding said rectangular display panel, comprising:

a first component member made of a metal making up a side portion of said support frame and having convex portions and concave portions arranged alternately in a manner that each of said convex portions and said concave portions is bilaterally symmetrical at an end portion of said first component member and having a shear droop and a burr formed at an end portion of each of said first component member;

a second component member made of a resin making up a corner of said support frame and having convex portions and concave portions arranged alternately and having said shear droop and said burr formed at an end portion of each of said second component member and having a positioning portion on its upper surface to be used for attaching said display panel to a predetermined place; and wherein end portions of said first and second component members are fitted and coupled by placing said convex portions and said concave portions in such a manner that said shear droop of each of said convex portions faces said burr of each of said concave portions and said burr of each of said convex portions faces said shear droop of each of said concave portions.

15. The support frame of the rectangular display panel according to claim 14, wherein each of said convex portions and said concave portions has an approximately trapezoidal configuration.

16. The support frame of the rectangular display panel according to claim 14, wherein each of said convex portions and said concave portions has an approximately figure-8-shaped configuration.

17. The support frame of the rectangular display panel according to claim 14, wherein a pair of said component members to be fitted and coupled is made of a metal having high hardness and end portions of said pair of said component members made of said metal having high hardness are fitted and coupled with a fitting and coupling member made of a metal having low hardness being interposed between said component members made of said metal having high hardness.

18. A display device equipped with the support frame which supports a rectangular display panel and a portion surrounding said display panel stated in claim 14.

\* \* \* \* \*